United States Patent
Okamoto

(10) Patent No.: US 9,268,961 B2
(45) Date of Patent: Feb. 23, 2016

(54) STORAGE SYSTEM, STORAGE CONTROL APPARATUS, AND STORAGE CONTROL METHOD

(75) Inventor: Hiroshi Okamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 607 days.

(21) Appl. No.: 13/357,829

(22) Filed: Jan. 25, 2012

(65) Prior Publication Data

US 2012/0239943 A1 Sep. 20, 2012

(30) Foreign Application Priority Data

Mar. 18, 2011 (JP) .................. 2011-061734

(51) Int. Cl.
*G06F 21/00* (2013.01)
*G06F 21/62* (2013.01)

(52) U.S. Cl.
CPC .... *G06F 21/6218* (2013.01); *G06F 2221/2143* (2013.01)

(58) Field of Classification Search
USPC .............. 380/44–47, 277–286; 713/189, 193; 726/26, 30
See application file for complete search history.

(56) References Cited

U.S. PATENT DOCUMENTS

| | | | |
|---|---|---|---|
| 2008/0082836 A1* | 4/2008 | Osaki | 713/193 |
| 2009/0049236 A1* | 2/2009 | Kinoshita | 711/112 |
| 2011/0185192 A1* | 7/2011 | Kito et al. | 713/193 |
| 2011/0258456 A1* | 10/2011 | Lyakhovitskiy | 713/189 |

FOREIGN PATENT DOCUMENTS

| | | |
|---|---|---|
| JP | 2002-215462 A | 8/2002 |
| JP | 2008-198049 A | 8/2008 |
| JP | 2008-269232 A | 11/2008 |

* cited by examiner

*Primary Examiner* — Joseph P Hirl
*Assistant Examiner* — Chi Nguy
(74) *Attorney, Agent, or Firm* — Fujitsu Patent Center

(57) ABSTRACT

In a storage system, a storage apparatus has an encryption key generator and an encryption processor that encrypts data to be recorded in a storage region using an encryption key from the encryption key generator, and is able to change an encryption key for each divided region set in the storage region. A control apparatus has a logical volume setting unit that requests the encryption processor to set an individual divided region for each storage region set as a logical volume in the storage region of the storage apparatus and a data erasure processor that requests the encryption processor to change the encryption key used for encryption in the divided region corresponding to the logical volume to be erased.

16 Claims, 22 Drawing Sheets

STORAGE SYSTEM, STORAGE CONTROL APPARATUS, AND STORAGE CONTROL METHOD

CROSS-REFERENCE TO RELATED APPLICATION

This application is based upon and claims the benefit of priority of the prior Japanese Patent Application No. 2011-061734, filed on Mar. 18, 2011, the entire contents of which are incorporated herein by reference.

FIELD

The embodiments discussed herein relate to a storage system, a storage control apparatus, and a storage control method.

BACKGROUND

When discarding storage apparatuses, such as hard disk drives (HDDs), as a method for preventing information recorded in the discarded storage apparatus from leaking out, there is a method for overwriting the data within the storage apparatus with a data pattern having no relation to the original data. But, this method has such a problem that it takes a long time to overwrite all the data recorded in the storage apparatus with a data pattern.

In contrast to this, there is a method for recoding data always in an encrypted state in a storage apparatus. For example, there is a storage apparatus including a self encrypting function to encrypt data to be recoded in an internal recording medium and a function to store an encryption key used for encryption. In this storage apparatus, it is possible to invalidate data recorded in the recording medium in a brief time by processing of deleting or changing the encryption key stored inside thereof in accordance with a command from outside. In the following explanation, to invalidate encrypted data by deleting or changing the encryption key is called "to completely erase".

Further, in recent years, as a storage apparatus including the self encrypting function, there is a storage apparatus called a "self encrypting drive (SED)". The SED also includes a function to generate a random encryption key and it is possible to completely erase recorded data in a brief time by instructing the SED to change the encryption key corresponding to the recorded data.

As technology to record, in a storage apparatus, data which is encrypted using an encryption key generated by a device that accesses the storage apparatus, for example, there is a computer system that writes data into a storage apparatus after encrypting the data using an encryption key different for each logical volume.

Further, as technology relating to data erasure in a storage apparatus, for example, there is a storage system that erases data in a first storage region as well as notifying an originator of an erasure request that access is allowed to a second storage region, which is different from the first storage region, upon receipt of the request to erase data in the first storage region.
Japanese Laid-Open Patent Publication No. 2008-269232
Japanese Laid-Open Patent Publication No. 2002-215462
Japanese Laid-Open Patent Publication No. 2008-198049

As described above, when data to be recorded in the storage apparatus is encrypted using an encryption key different for each logical volume, it is possible to completely erase data in a brief time for each logical volume by erasing or changing the encryption key corresponding to the logical volume. In a system in which a device that accesses the storage apparatus generates an encryption key, data encrypted in the access source device is simply written into the storage apparatus. Because of this, it is possible to completely erase data in a brief time for each logical volume when the access source device side manages information about the logical volume, such as a setting region and encryption key.

But, when the recording destination of data is an SED, it is not possible to achieve processing of completely erasing data in a brief time for each logical volume when the access source device side alone manages information about the logical volume. This is because in an SED, recorded data is encrypted using an encryption key generated by the SED itself, and therefore, it is necessary for the SED itself to manage information of the region and encryption key to be erased completely.

SUMMARY

According to one aspect of the present embodiment, a storage system includes a storage apparatus and a control apparatus that controls access to the storage apparatus. The storage apparatus includes an encryption key generator that generates an encryption key and an encryption processor configured to encrypt data using the encryption key generated by the encryption key generator and record the data in a storage region of the storage apparatus, and to be able to change an encryption key used for encryption for each divided region set in the storage region of the storage apparatus. The control apparatus includes a logical volume setting unit that requests the encryption processor of the storage apparatus to set an individual divided region for each storage region set as a logical volume in the storage region of the storage apparatus and a data erasure processor that requests the encryption processor of the storage apparatus to change the encryption key used for encryption of the divided region corresponding to the logical volume to be erased.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
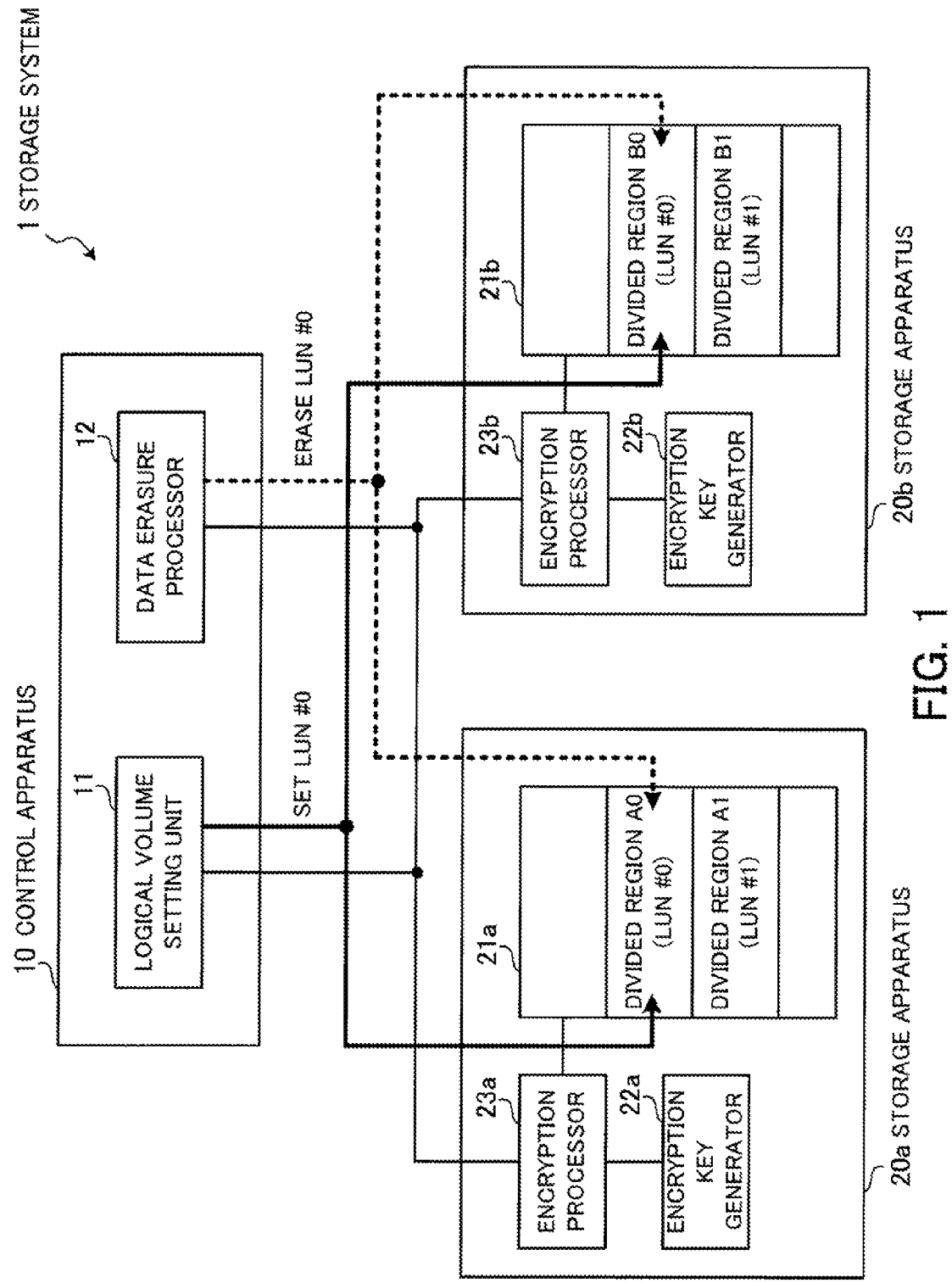
FIG. 1 is a configuration example of a storage system according to a first embodiment.

Embodiments will be described below in detail with reference to the accompanying drawings, wherein like reference numerals refer to like elements throughout.

First Embodiment

FIG. 1 is a configuration example of a storage system according to a first embodiment. A storage system 1 illustrated in FIG. 1 includes a storage apparatus and a control apparatus 10 that controls access to the storage apparatus. The storage system 1 of FIG. 1 includes two storage apparatuses 20a and 20b as an example, but, may include three or more storage apparatuses or only one storage apparatus.

The storage apparatus 20a includes a storage region 21a to be accessed by the control apparatus 10. The storage region 21a is realized by, for example, a recording medium, such as a magnetic disc. The storage apparatus 20a further includes an encryption key generator 22a that generates an encryption key and an encryption processor 23a that encrypts data using the encryption key generated by the encryption key generator 22a and records the encrypted data in the storage region 21a. When reading data recorded in the storage region 21a, the encryption processor 23a decodes the read data using an encryption key.

The encryption key generator 22a generates a unique encryption key each time it receives a request to generate an encryption key from the encryption processor 23a.

It is made possible for the encryption processor 23a to set a divided region in the storage region 21a in response to a request from the control apparatus 10. It is made possible for the encryption processor 23a to change an encryption key used for encryption and decoding for each divided region in response to a request from the control apparatus 10. When changing an encryption key, the encryption processor 23a causes the encryption key generator 22a to generate a new encryption key and after that, encrypts recorded data and decodes read data using the encryption key newly generated.

When the encryption key used in the divided region is changed, the data recorded in the divided region before the encryption key is changed enters a "completely erased" state where the data is no longer read as relevant data. By completely erasing recorded data in a region by changing the encryption key as described above, it is possible to bring recorded data into the "completely erased" state in a brief time compared to a method for overwriting all the recorded data in a region with a predetermined data pattern.

Similarly to the storage apparatus 20a, the storage apparatus 20b includes a storage region 21b, an encryption key generator 22b, and an encryption processor 23b. The storage region 21b, the encryption key generator 22b, and the encryption processor 23b correspond to the storage region 21a, the encryption key generator 22a, and the encryption processor 23a included in the storage apparatus 20a, respectively.

The control apparatus 10 includes a logical volume setting unit 11 and a data erasure processor 12. Each processing of the logical volume setting unit 11 and the data erasure processor 12 is performed by, for example, a central processing unit (CPU) included in the control apparatus 10 executing predetermined programs. In the following explanation, the N-th logical volume is represented as "LUN (Logical Unit Number) #N".

The logical volume setting unit 11 sets a range of each of the storage regions 21a and 21b of the storage apparatuses 20a and 20b as a logical volume. Further, the logical volume setting unit 11 requests the encryption processor of the storage apparatus in which the logical volume is included to set an individual divided region for each storage region set as a logical volume. For example, when setting the storage region 21a of the storage apparatus 20a as a logical volume, the logical volume setting unit 11 requests the encryption processor 23a of the storage apparatus 20a to set a divided region in the region corresponding to the logical volume on the storage region 21a.

Further, it is also possible for the logical volume setting unit 11 to set a logical volume spanning a plurality of storage apparatuses. When setting a logical volume spanning a plurality of storage apparatuses, the logical volume setting unit 11 requests the encryption processors of the plurality of storage apparatuses to set a storage region included in each of the plurality of storage apparatuses in the storage region of the logical volume to be set as each divided region.

For example, when setting LUN #0 spanning the storage regions 21a and 21b, the logical volume setting unit 11 requests the encryption processor 23a of the storage apparatus 20a to set a divided region A0 and at the same time, requests the encryption processor 23b of the storage apparatus 20b to set a divided region B0. Here, the divided region A0 is a region included in the storage region 21a of the LUN #0 and the divided region B0 is a region included in the storage region 21b of the LUN #0.

Further, for example, also when setting LUN #1 spanning the storage regions 21a and 21b, the logical volume setting unit 11 requests the encryption processor 23a of the storage apparatus 20a to set a divided region A1 and at the same time, requests the encryption processor 23b of the storage apparatus 20b to set a divided region B1. Due to this, in the storage region 21a of the storage apparatus 20a, the divided region A1 is set and in the storage region 21b of the storage apparatus 20b, the divided region B1 is set.

The data erasure processor 12 requests the encryption processors 23a and 23b of the storage apparatuses 20a and 20b to completely erase data for each logical volume. For example, when completely erasing the logical volume set in the storage apparatus 20a, the data erasure processor 12 requests the encryption processor 23a of the storage apparatus 20a to change the encryption key of the divided region within the storage region 21a of the storage apparatus 20a corresponding to the logical volume to be erased. The encryption processor 23a having received the request to change the encryption key causes the encryption key generator 22a to generate a new encryption key and after that, uses the new encryption key when encrypting data to be recorded in the divided region and decoding data read from the divided region. Due to this, the data recorded in the logical volume to be erased is erased completely before the data erasure processor unit 12 requests to completely erase the data. That is, it is possible for the control apparatus 10 to completely erase data in a brief time for each logical volume.

When requesting to completely erase the logical volume set spanning the storage regions 21a and 21b, the data erasure processor 12 requests the encryption processors 23a and 23b of the storage apparatuses 20a and 20b to change the encryption key of the divided region in the storage regions 21a and 21b, respectively, corresponding to the logical volume to be erased. Due to this, it is possible to completely erase recorded data in a brief time for each logical volume even when the logical volume spans the storage regions of the plurality of storage apparatuses.

For example, when completely erasing the LUN #0 in FIG. 1, the data erasure processor 12 requests the encryption processor 23a of the storage apparatus 20a to change the encryption key used for encrypting data to be recorded in the divided region A0 as illustrated by a dotted arrow in FIG. 1. At the same time, the data erasure processor 12 requests the encryption processor 23b of the storage apparatus 20b to change the encryption key used for encrypting data to be recorded in the divided region B0.

The encryption processor 23a of the storage apparatus 20a having received the request to change the encryption key causes the encryption key generator 22a to generate a new encryption key and after that, uses the new encryption key for encrypting data to be recorded in the divided region A0 and decoding data recorded in the divided region A0. Similarly, the encryption processor 23b of the storage apparatus 20b having received the request to change the encryption key causes the encryption key generator 22b to generate a new encryption key and after that, uses the new encryption key for encrypting data to be recorded in the divided region B0 and decoding data recorded in the divided region B0.

As described above, when data of the LUN #0 is erased completely, the encryption key used for encryption and decoding is changed in the divided regions A0 and B0 included in the LUN #0, respectively. Due to this, it is possible to completely erase only the data of the LUN #0 in a brief time.

Second Embodiment

Figure 2:
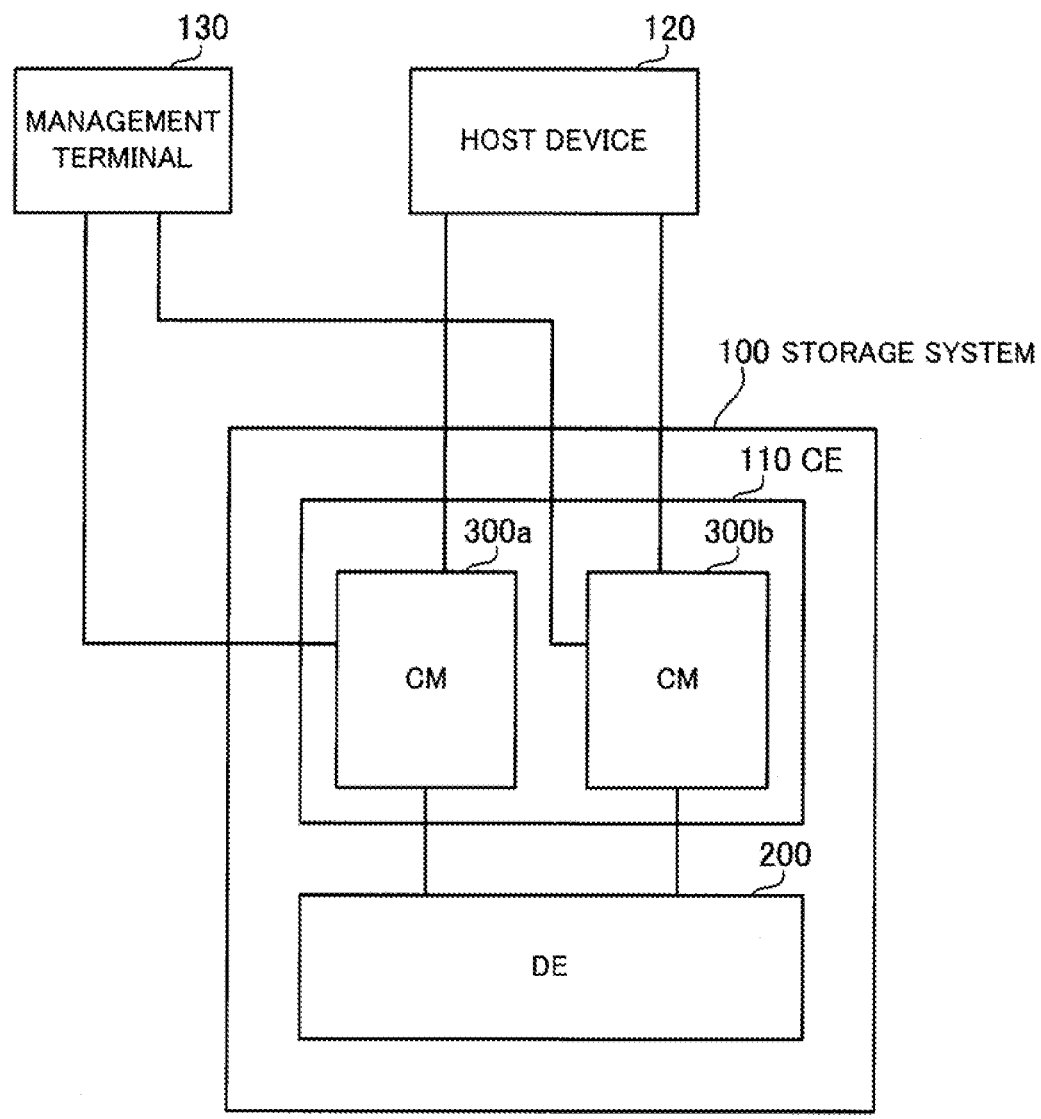
FIG. 2 is a configuration example of a storage system according to a second embodiment.

Next, as a second embodiment, an example of a storage system that manages a storage apparatus by redundant arrays of inexpensive disks (RAID) is explained. FIG. 2 is a configuration example of a storage system according to the second embodiment.

A storage system 100 illustrated in FIG. 2 includes a controller enclosure (CE) 110 and a drive enclosure (DE) 200. On the controller enclosure 110, controller modules (CM) 300a and 330b are mounted. To the storage system 100, a host device 120 and a management terminal 130 are connected.

The drive enclosure 200 includes a plurality of storage apparatuses the access of which from the controller modules 300a and 300b is to be controlled. The drive enclosure 200 includes an SED, which is an HDD including the self encrypting function, as a storage apparatus. The drive enclosure 200 may be provided two or more in number within the storage system 100. Further, the drive enclosure 200 may be provided within a case different from that of the controller modules 300a and 300b.

The controller modules 300a and 300b manage a physical storage region realized by a plurality of SEDs within the drive enclosure 200 by RAID and controls access to the physical storage region. Further, the controller modules 300a and 300b set a logical volume in the physical storage region realized by a plurality of SEDs within the drive enclosure 200, receives an access request to the logical volume from the host device 120, and accesses an SED within the drive enclosure 200 according to the access request.

The controller module may be provided one or three or more in number within the storage system 100. When the controller module is provided two or more in number, the access control system is given redundancy with respect to the drive enclosure 200 and reliability of the access control processing is improved.

The host device 120 requests the controller modules 300a and 300b to access the logical volume provided by the controller modules 300a and 300b in response to the operation of a user. The host device 120 and the controller modules 300a and 300b are connected via, for example, a Fibre Channel (FC) cable.

The management terminal 130 performs various kinds of setting processing relating to the operation of the storage system 100, such as RAID and logical volume, for the controller modules 300a and 300b in response to the operation of an administrator. The management terminal 130 and the controller modules 300a and 300b are connected via, for example, a local area network (LAN) cable.

Figure 3:
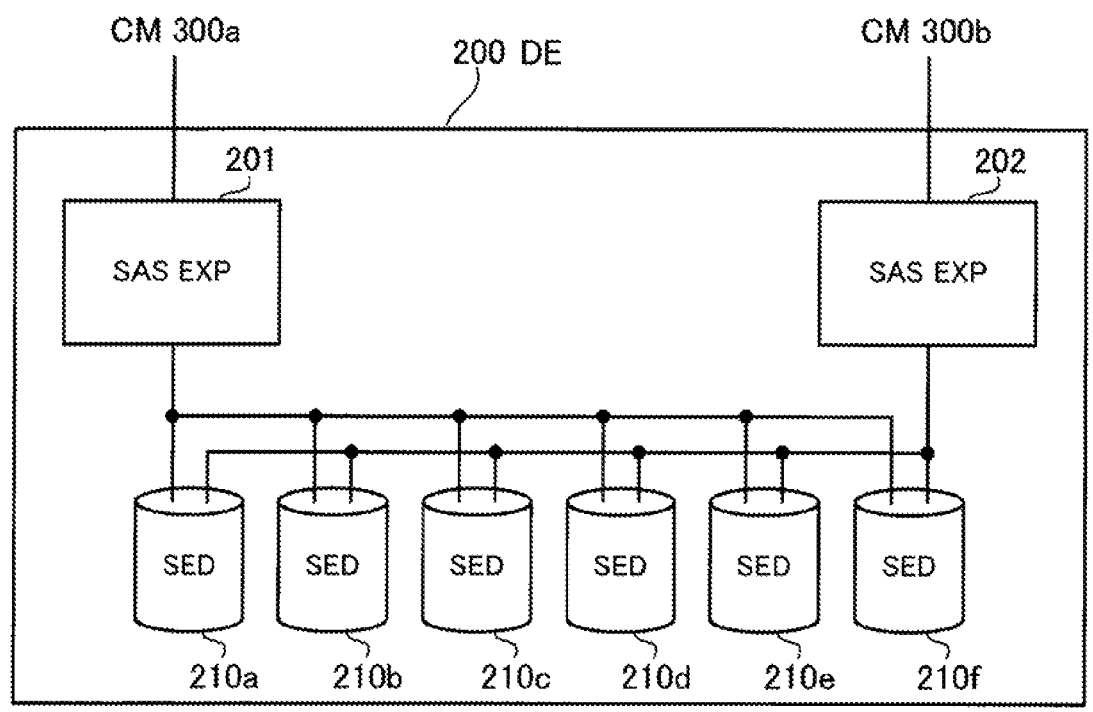
FIG. 3 is a hardware configuration example of a DE.

FIG. 3 is a hardware configuration example of a drive enclosure. The drive enclosure 200 includes serial attached small computer system interface (SAS) expanders 201 and 202 and a plurality of SEDs 210a to 210f. The SAS expander 201 relays data between the controller module 300a and the SEDs 210a to 210f. The SAS expander 202 relays data between the controller module 300b and the SEDs 210a to 210f.

Figure 4:
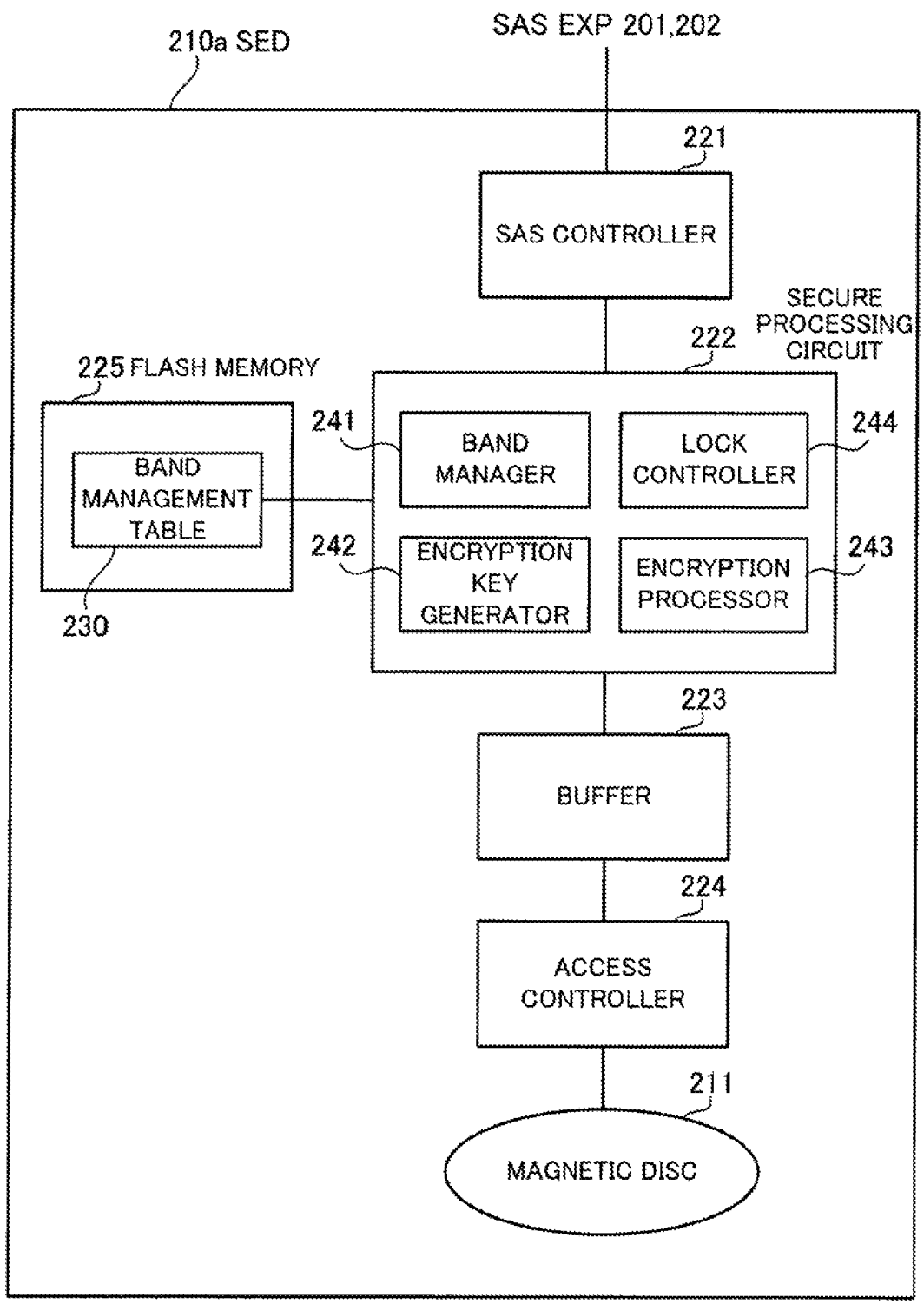
FIG. 4 is an internal configuration example of an SED.

FIG. 4 is an internal configuration example of an SED. In FIG. 4, the SED 210a is illustrated as an example, but, the SEDs 210b to 210f also have the same configuration as that of FIG. 4.

The SED 210a includes a magnetic disc 211 as a recording medium. The SED 210a may include another kind of recording medium, such as a solid state drive (SSD), as a recording medium.

Further, the SED 210a includes an SAS controller 221, a secure processing circuit 222, a buffer 223, an access controller 224, and a flash memory 225. In FIG. 4, a magnetic head mechanism that reads and writes data from and into the magnetic disc 211, a rotation driving mechanism of the magnetic disc 211, etc., are not illustrated schematically.

The SAS controller 221 connects with the controller module 300a via the SAS expander 201 and at the same time, connects with the controller module 300b via the SAS expander 202. The SAS controller 221 transmits and receives data to and from the controller modules 300a and 300b according to the SAS standard.

The secure processing circuit 222 refers to a band management table 230 recorded in the flash memory 225 and performs processing to keep safety of access to the magnetic disc 211 and data recorded in the magnetic disc 211. The secure processing circuit 222 includes a band manager 241, an encryption key generator 242, an encryption processor 243, and a lock controller 244.

Processing of the band manager 241, the encryption key generator 242, the encryption processor 243, and the lock controller 244 is implemented by, for example, respective dedicated hardware circuits. It may also be possible for the secure processing circuit 222 to include a CPU and for at least part of the processing of the encryption key generator 242, the encryption processor 243, and the lock controller 244 to be implemented by the CPU executing predetermined firmware programs. But, it is desirable for the processing of the encryption processor 243 and the encryption key generator 242 to be implemented by a dedicated hardware circuit intended to increase the speed of processing.

The band manager 241 sets a "band" in the magnetic disc 211. The band is a region where encryption of data to be recorded and decoding of recorded data are performed using each individual encryption key. Upon receipt of a request to set a band from either of the controller modules 300a and 300b, the band manager 241 causes the encryption key generator 242 to generate a random encryption key and registers the generated encryption key in association with information indicative of the setting region of the band in the band management table 230.

It is made possible for the band manager 241 to perform "secure erase" to completely erase recorded data for each band. When a band to be subjected to secure erase is specified by either of the controller modules 300a and 300b, the band manager 241 causes the encryption key generator 242 to generate a new encryption key. Then, the band manager 241 changes the encryption key used for encryption of recorded data and decoding of read data of the specified band to the encryption key newly generated. By changing the encryption key to another as described above, the data recorded in the specified band is brought into a "completely erased" state where data is no longer read as relevant data.

The band manager 241 manages a region of the storage region of the magnetic disc 211, in which a band based on the setting request from the controller modules 300a and 300b is not set, as a "global band". The global band is a region where data is recorded using an encryption key different from that of a set band. The setting region and encryption key of the global band are also registered in the band management table 230. In the shipping state of the product of the SED 210a, all the storage regions within the magnetic disc 211 are set to the global band. Then, when a band is set in the magnetic disc 211, the region where no band is set remains as the global band. Further, the region in which the setting of a band is released returns to the global band.

The encryption key generator 242 generates a random encryption key according to a request from the band manager 241.

The encryption processor 243 performs encryption processing of data to be recorded in the magnetic disc 211 and decoding processing of data recorded in the magnetic disc 211. The encryption processor 243 reads, from the band management table 230, the encryption key corresponding to the recording destination of the data and the address from which data is read, and performs encryption processing of data and decoding processing of data using the encryption key that is read.

The lock controller 244 controls whether to permit or inhibit access to the magnetic disc 211 from outside for each band. Here, a state where the magnetic disc 211 is set so as not to be accessed is called a "lock state". When the band of the magnetic disc 211 is in the lock state, the lock controller 244 performs authentication processing with an external device (for example, the controller module 300a or 300b) connected to the SED 210a and when authentication succeeds, the lock controller 244 releases the lock state of the band and permits access to the band from the external device authenticated successfully. In the band management table 230, an authentication key is registered for each band and authentication processing is performed by determining whether the authentication key received from the external device connected to the SED 210a agrees with the authentication key registered in the band management table 230.

In the present embodiment, the lock controller 244 performs an "automatic lock operation" to bring all the bands of the magnetic disc 211 into the lock state when the power source of the SED 210a is turned on from the off state. After the power source of the SED 210a is turned on and the automatic lock operation is performed, when an external device (for example, the controller module 300a or 300b) is connected to the SED 210a, the lock controller 244 performs authentication processing with the connected external device for all the bands. Because of this, the larger the number of set bands, the longer is the time until the external device is permitted to access the magnetic disc 211.

The buffer 223 temporarily stores data to be recorded in the magnetic disc 211 and data read from the magnetic disc 211.

The access controller 224 gives an error correction code to or modulates a signal to be written into the magnetic disc 211, performs demodulation and error correction of the signal read from the magnetic disc 211, positioning control of a magnetic head (not illustrated schematically), rotation driving control of the magnetic disc 211, etc.

Figure 5:
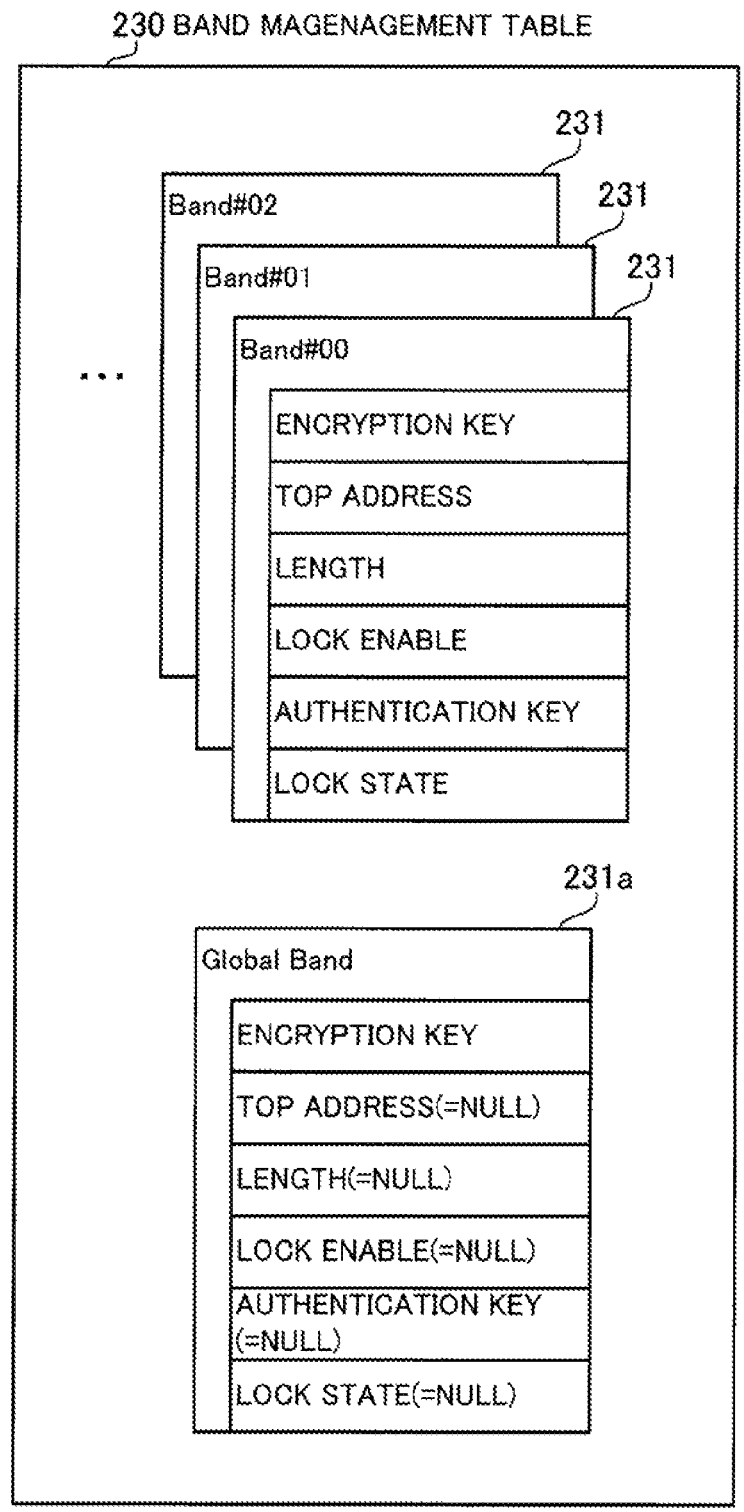
FIG. 5 is an example of information registered in a band management table.

FIG. 5 is an example of information registered in the band management table. In the band management table 230, a record 231 about each band is registered.

In the record 231, "Encryption key", "Top address", "Length", "Lock enable", "Authentication key", and "Lock state" are registered in association with identification information of a band ("Band #00", "Band #01", etc., in FIG. 5).

"Encryption key" is an encryption key used for encryption of data to be recorded in the band and decoding of data read from the band.

"Top address" is an address indicative of the forefront of the setting region of the band in the magnetic disc 211. "Length" indicates the size of the setting region of the band in the magnetic disc 211. The size of the band setting region is represented as the number of fixed-length blocks.

"Lock enable" is flag information indicating whether or not the automatic lock operation is enabled. For example, is set to "Lock enable" when the automatic lock operation is enabled (that is, it is set so that when the power source of the SED to which the band management table 230 is registered is turned on from the off state, the band is brought into the lock state automatically) and "NULL value" is set when the automatic lock operation is not enabled.

"Authentication key" is information used for authentication processing when releasing the lock state of the band. Upon receipt of an authentication key used for authentication processing through the controller module transmitted from the management terminal 130 in response to the operation of the administrator, the lock controller 244, for example, hashes the received authentication key and registers the authentication key in the box of "Authentication key".

In the box of "Authentication key", only when the "Lock enable" is set to "1" (that is, the automatic lock operation is enabled), information is registered. It may also be made possible to bring the band into the lock state at any timing in response to a request from either of the controller modules 300a and 300b in addition to the automatic lock operation. In this case, for example, when it is requested to bring the band into the lock state, the value obtained by hashing the authentication key notified from the management terminal 130 through the controller module is registered in the box of "Authentication key" regardless of the value of "Lock enable".

The hashed authentication key may be stored in, for example, a predetermined region of the magnetic disc 211 instead of the band management table 230.

"Lock state" is flag information indicating whether or not the band is in the lock state. The "lock state" is set to "1" when the band is in the lock state and to "0" when the band is not in the lock state.

One of the records 231 (a record 231a in FIG. 5) within the band management table 230 holds information of the global band. In the record 231a about the global band, the key used for encryption and decoding of data is registered in the box of "Encryption key", but, nothing is registered in other boxes (that is, NULL value is set). The setting region of the global band is the entire region except for the setting region of the other bands.

In the initial stage where the SED is shipped, the entire region of the magnetic disc 211 within the SED is set to the global band. At this time, in the band management table 230, only the record 231a about the global band is registered. After that, when the controller module performs processing of setting a band in response to a request from the management terminal 130 to the controller module, the band manager 241 of the SED generates the record 231 about the band to be set newly and registers necessary information in the record 231.

In FIG. 5, the record 231a of the global band is illustrated separated from the records 231 of the other bands, but, as to the identification information of the band, "Band #00" may be allocated to the global band and "Band #01" and the subsequent identification information to the other bands.

It may also be made possible to bring the global band also into the lock state. In this case, to the record 231a about the global band also, each piece of information of "Lock enable", "Authentication key", and "Lock state" is registered as to the records 231 about the other bands.

Next, the controller modules 300a and 300b are explained. The controller modules 300a and 300b each have the same hardware configuration and are capable of performing the same processing, and therefore, in the following explanation, only the controller module 300a is explained as an example and explanation of the controller module 300b is omitted.

Figure 6:
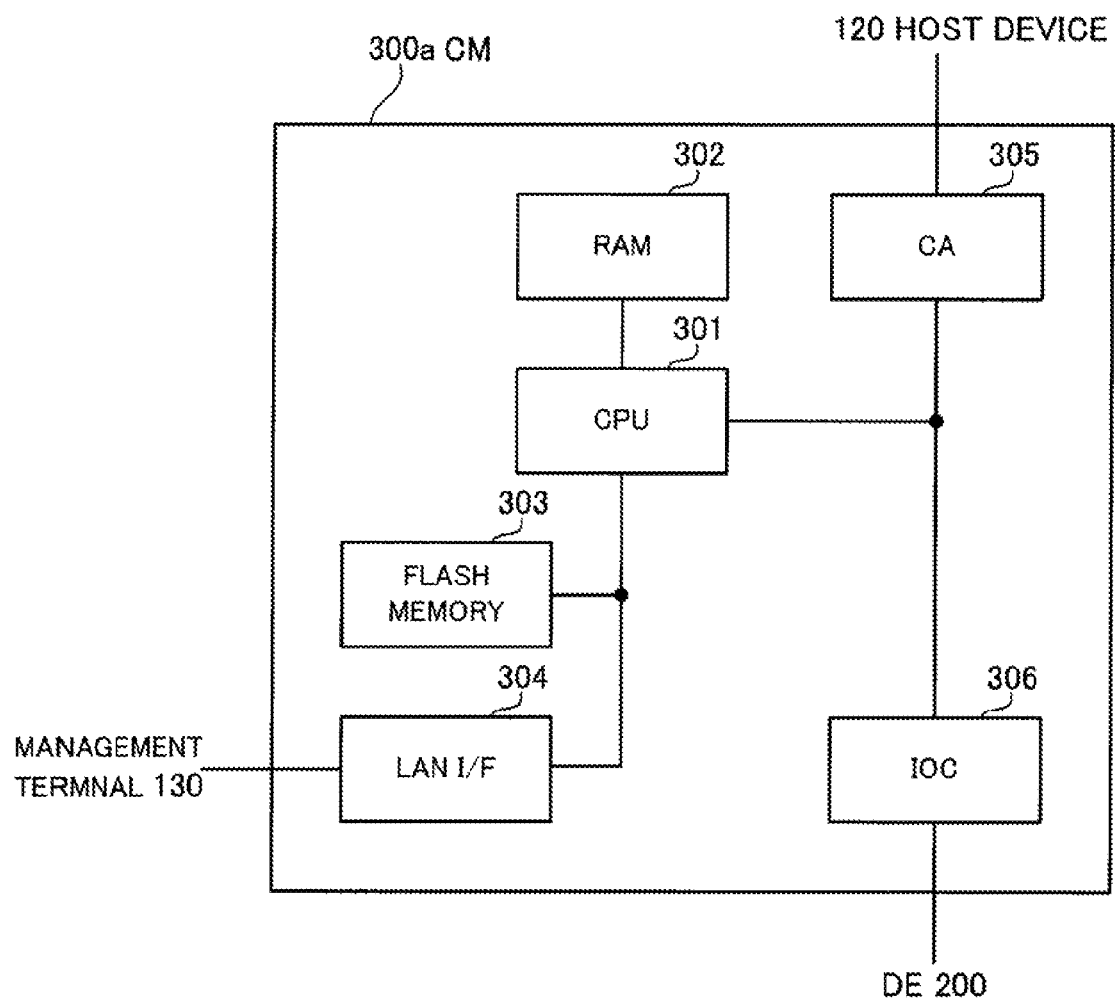
FIG. 6 is a hardware configuration example of a CM.

FIG. 6 is a hardware configuration example of the controller module. The whole of the controller module 300a is controlled by a CPU 301. To the CPU 301, a random access memory (RAM) 302 and a plurality of peripheral devices are connected. The RAM 302 is used as a main storage apparatus of the controller module 300a and temporarily stores at least part of programs that the CPU 301 is caused to execute and various kinds of data necessary for processing by the programs.

To the CPU 301, a flash memory 303, a LAN interface (I/F) 304, a channel adapter (CA) 305, and an In/Out controller (IOC) 306 are connected as an example of the peripheral device. The flash memory 303 and the LAN interface 304 are connected to the CPU 301 via, for example, a platform controller hub (PCH), not illustrated schematically. The channel adapter 305 and the IOC 306 are connected to the CPU 301 through, for example, a peripheral component interconnect (PCI) bus.

The flash memory 303 is used as a secondary storage apparatus of the controller module 300a and stores programs executed by the CPU 301, various kinds of data necessary to execute the programs, etc. As a secondary storage apparatus, another kind of nonvolatile storage apparatus, such as an HDD, may be used.

The LAN interface 304 transmits and receives data to and from the management terminal 130. The channel adapter 305 performs interface processing of transmitting and receiving data between the host device 120 and the controller module 300a.

The IOC 306 transmits and receives data to and from the SEDs 201a to 210f within the drive enclosure 200 via the SAS expander 201 within the drive enclosure 200 according to the SAS standard.

Figure 7:
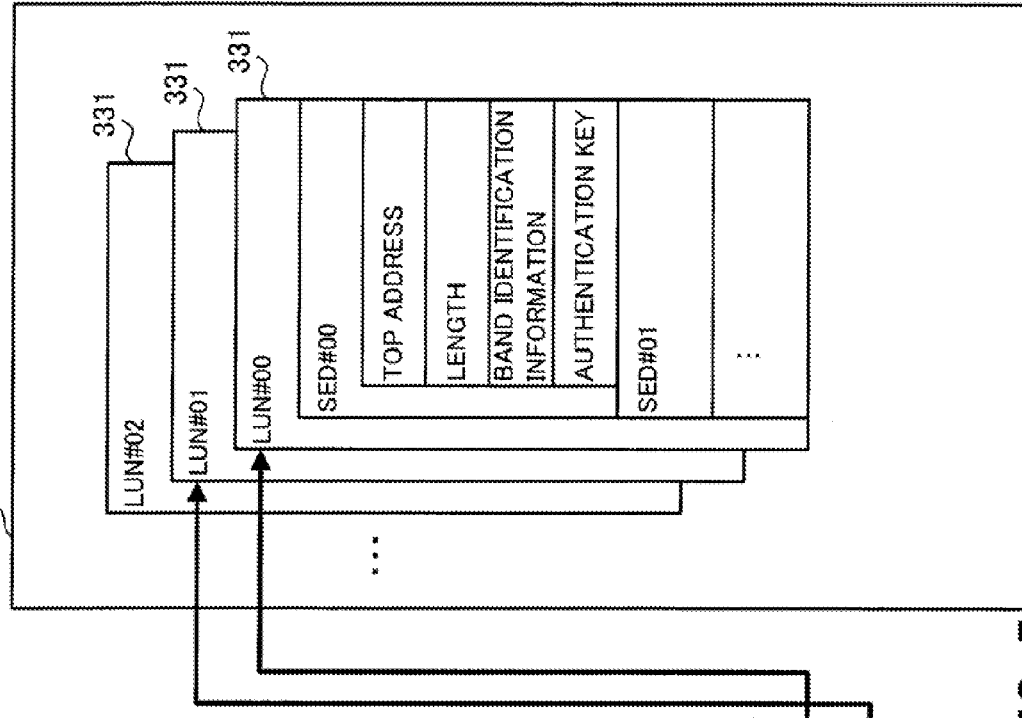
FIG. 7 is a data configuration example of a table held by a CM.
Figure 7:
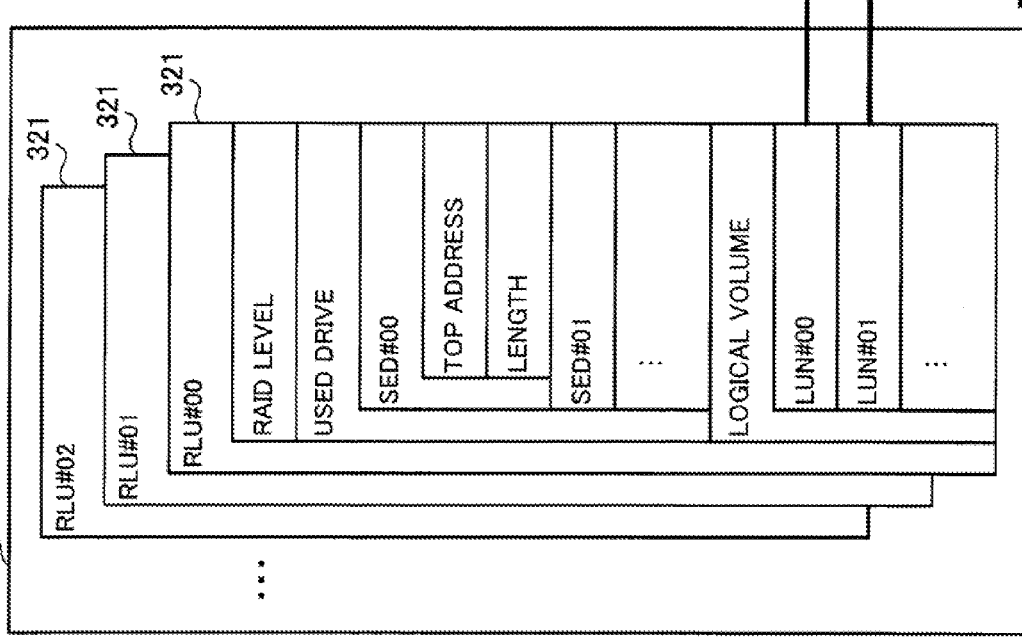

Next, FIG. 7 is a data configuration example of a table held by the controller module. In the flash memory 303 of the CM 300a, a RAID management table 320 and a logical volume (LV) management table 330 are stored.

In the RAID management table 320, a record 321 is registered for each RAID logical unit (RLU) each indicating a RAID group. The RAID group is a logical storage region configured by a combination of physical storage regions of a plurality of storage apparatuses (SEDs in the present embodiment). In each record 321 of the RAID management table 320, "RAID level", "Used drive", and "Logical volume" are recorded in association with identification information of the RLU ("RLU #00", "RLU #01", etc., in FIG. 7).

In the box of "RAID level", a RAID level applied to the RLU is registered. In the box of "Used drive", identification information indicative of the SED used by the RLU is registered. Further, "Top address" and "Length" are registered in association with each SED. "Top address" is an address indicative of the forefront of the setting region of the RLU in the magnetic disc 211 within the SED. "Length" indicates the size (the number of blocks) of the setting region of the RLU in the magnetic disc 211 within the SED. In the box of "Logical volume", identification information indicative of the logical volume set in the RLU is registered.

On the other hand, in the LV management table 330, a record 331 is registered for each logical volume set in the RLU. For example, in the RAID management table 320 of FIG. 8, in the "RLU #00", the "LUN #00" and "LUN #01" are registered as logical volumes. In this case, in the LV management table 330, the records 331 corresponding to the "LUN #00" and "LUN #01" are registered, respectively. In FIG. 7, the relationships between the "LUN #00" and "LUN #01" registered in the RAID management table 320 and the records 331 within the LV management table 330 are indicated by thick line arrows.

In the record 331 of the LV management table 330, information about the SED including the physical storage region of the logical volume is registered. In the record 331, as information about the SED, "Top address", "Length", "Band identification information", and "Encryption key" are registered also in association with identification of the SED ("SED #00", "SED #01, etc., in FIG. 7).

"Top address" is an address indicative of the forefront of the setting region of the logical volume in the magnetic disc 211 within the SED. "Length" indicates the size (the number of blocks) of the setting region of the logical volume in the magnetic disc 211 within the SED.

"Band identification information" is information for identifying a band set in the physical storage region of the magnetic disc 211 indicated by "Top address" and "Length". When the range of the physical storage region indicated by "Top address" and "Length" agrees with the range of one band, the values of "Top address" and "Length" are the same values as those registered in "Top address" and "Length", respectively, in the band management table 230 within the SED corresponding to the band indicated by "Band identification information".

"Authentication key" is an authentication key notified to the SED at the time of authentication processing to release the lock state of the band indicated by "Band identification information".

There are some cases where the logical volume is set spanning a plurality of SEDs. When the logical volume spans a plurality of SEDs, in the record 331 of the LV management table 330 corresponding to the logical volume, "Top address", "Length", "Band identification information", and "Authentication key" are registered for each of the plurality of SEDs in which the physical storage region of the logical volume is included.

Basically, the logical volume is set in the SED configuring the RLU in which the logical volume is set. In the example of FIG. 7, the RLU #00 is configured by using at least the SED #00 and SED #01, and therefore, the LUN #00 set in the RLU #00 is set spanning at least the SED #00 and SED #01. Because of this, in the record 331 within the LV management table 330 corresponding to the LUN#00, "Top address", "Length", "Band identification information", and "Authentication key" are registered as to at least each of the SED #00 and SED #01.

Figure 8:
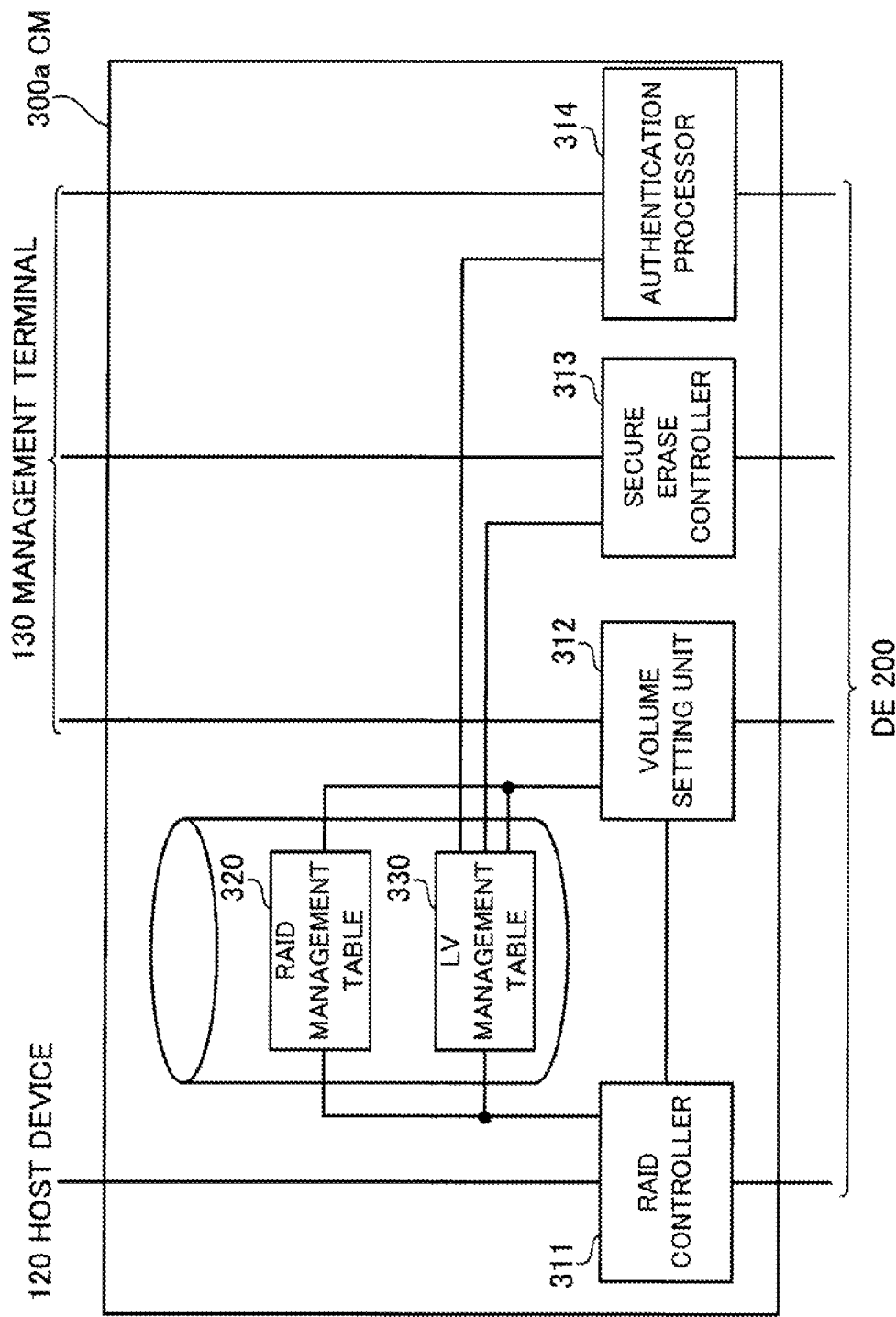
FIG. 8 is a block diagram of an example of a processing function included in a CM.

FIG. 8 is a block diagram of an example of a processing function included in the controller module. The controller module 300a includes a RAID controller 311, a volume setting unit 312, a secure erase controller 313, and an authentication processor 314. Processing of the RAID controller 311, the volume setting unit 312, the secure erase controller 313, and the authentication processor 314 is implemented by the CPU 301 of the controller module 300a executing predetermined programs.

The RAID controller 311 controls access to the SEDs 201a to 210f within the drive enclosure 200 in response to an access request from the host device 120. When controlling access to the SEDs 201a to 210f, the RAID controller 311 refers to the RAID management table 320 and the LV management table 330 and manages the physical storage regions of the SEDs 201a to 210f by the RAID.

For example, when write of data into a logical volume registered in the LV management table 330 is requested by the host device 120, the RAID controller 311 extracts the record 321 of the RLU in which the logical volume to be written is included, from the RAID management table 320. The RAID controller 311 performs write processing according to the RAID level registered in the record 321 with at least one of the SEDs registered in the extracted record 321 as a write destination.

The volume setting unit 312 makes settings of the RLU and logical volume in response to a request from the management terminal 130.

For example, the volume setting unit 312 generates the record 321 in the RAID management table 320 in response to an RLU setting request from the management terminal 130. The volume setting unit 312 registers the RAID level specified by the management terminal 130 and identification information of the SED to be used, respectively, in the boxes of "RAID level" and "Used drive" of the generated record 321.

Further, upon receipt of a request to set a logical volume in any of the registered RLUs from the management terminal 130, the volume setting unit 312 registers a new logical volume number in the box of "Logical volume" within the record 321 of the RAID management table 320 corresponding to the RLU to be set. At the same time, the volume setting unit 312 generates the record 331 corresponding to the new logical volume number in the LV management table 330.

The volume setting unit 312 receives information for identifying the SED to which a logical volume is set and information for specifying the size of the logical volume from the management terminal 130. The volume setting unit 312 requests the band manager 241 of the SED to which the logical volume is to be set to set a band corresponding to the region in which the logical volume is set based on the information received from the management terminal 130. Further, the volume setting unit 312 registers information about the band set in the SED in the record 331 generated in the LV management table 330.

In addition to the above, the volume setting unit 312 performs rebuild and copy back processing. Rebuild processing is processing of causing, when any of the SEDs configuring the RLU fails, the RAID controller 311 to generate the same data as that recorded in the failed SED and writing the data in an SED, which is a hot spare. On the other hand, copy back processing is processing of writing back the data recorded in the hot spare SED into an SED put to use in place of the failed SED.

It is also possible for the volume setting unit 312 to perform processing called logical device expansion (LDE) in response to a request from the management terminal 130. LDE processing is processing of changing the configuration of RAID, such as the number of SEDs configuring the RLU, the capacity of the physical storage region configuring the RLU, and the RAID level.

The secure erase controller 313 performs control to completely erase the data recorded in the drive enclosure 200 for each logical volume in response to a request from the management terminal 130. When the logical volume to be erased is specified from the management terminal 130, the secure erase controller 313 determines the band included in the logical volume to be erased based on the LV management table 330. The secure erase controller 313 completely erases the data recorded in the band by requesting the band manager 241 of the SED in which the determined band is set to change the encryption key.

The authentication processor 314 executes authentication processing with the lock controller 244 of the SED in order to enable access to the band in the lock state within the SED. The authentication processor 314 reads the authentication key associated with the band to be authenticated from the record 331 of the LV management table 330 at the time of authentication processing and transmits the authentication key to the lock controller 244 of the SED.

Figure 9:
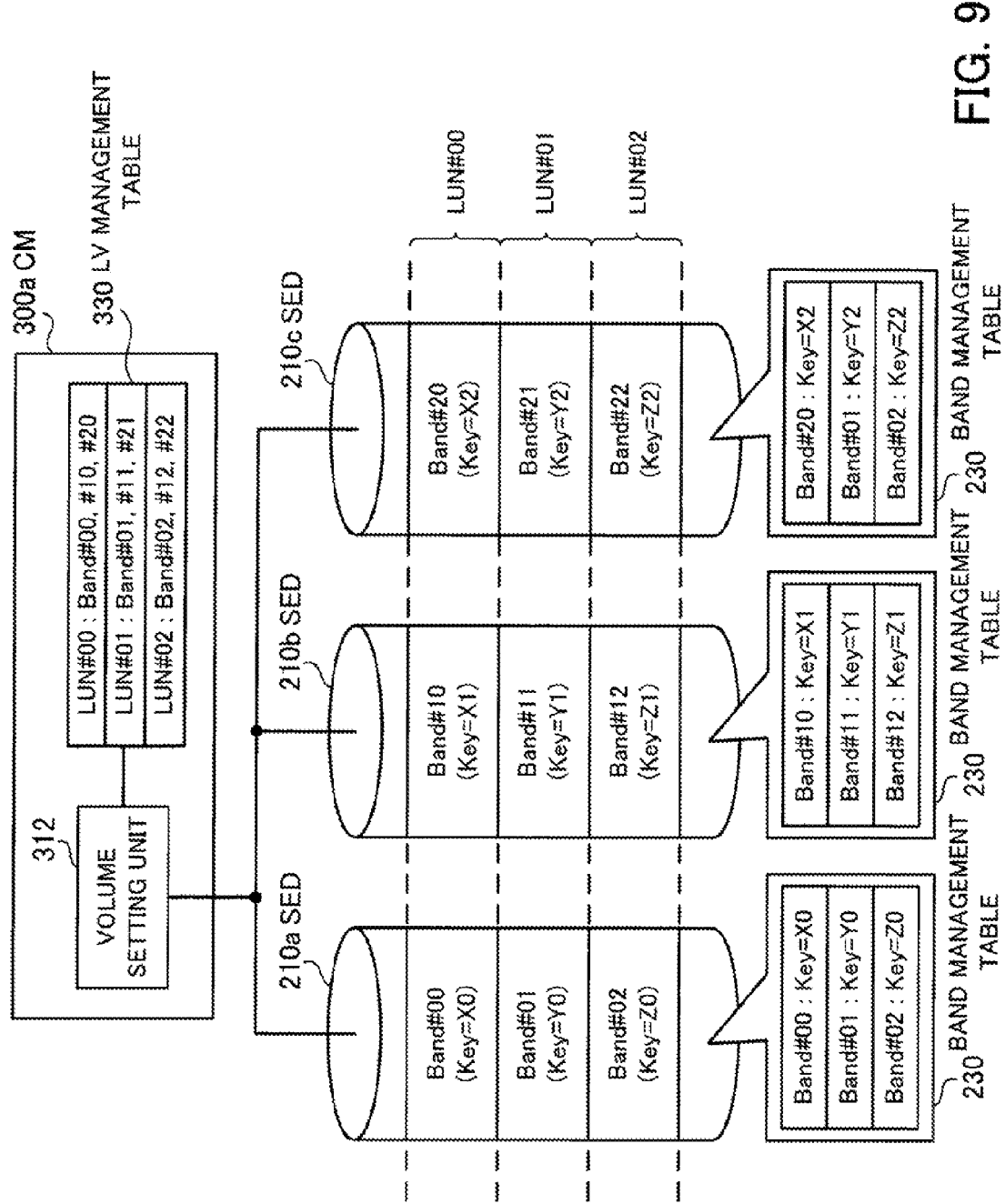
FIG. 9 illustrates processing of setting logical volumes spanning a plurality of SEDs.

Next, setting processing of a logical volume by the volume setting unit 312 is explained. FIG. 9 illustrates processing of setting logical volumes spanning a plurality of SEDs.

When setting a logical volume, the volume setting unit 312 of the controller module 300a requests the SED in which a logical volume is to be set to set a band for each logical volume. When the logical volume to be set spans a plurality of SEDs, the volume setting unit 312 requests each of the plurality of SEDs to set a band in the region that agrees with the logical volume.

For example, it is assumed that the volume setting unit 312 of the controller module 300a sets LUN #00 that spans the three SEDs 210a to 210c in FIG. 9. In this case, the volume setting unit 312 requests the SED 210a to set the band #00 in the region of the physical storage region of the LUN #00, which region is included in the SED 210a. Further, the volume setting unit 312 requests the SED 210b to set band #10 in the region of the physical storage region of the LUN #00, which region is included in the SED 210b. Furthermore, the volume setting unit 312 requests the SED 210c to set band #20 in the region of the physical storage region of the LUN #00, which region is included in the SED 210c.

The band manager 241 of the SED 210a (see FIG. 4) having received the request to set the band #00 sets the band #00. Specifically, the band manager 241 of the SED 210a generates the record 231 (see FIG. 5) about the band #00 in the band management table 230 and registers positional information of the band #00, an encryption key X0 used for encryption and decoding, etc., in the record 231.

Further, the band manager 241 of the SED 210b having received the request to set the band #10 generates the record 231 about the band #10 in the band management table 230 within the SED 210b and registers positional information of the band #10, an encryption key Y0 used for encryption and decoding, etc., in the record 231. Furthermore, the band manager 241 of the SED 210c having received the request to set the band #20 generates the record 231 about the band #20 in the band management table 230 and registers positional information of the band #20, an encryption key Z0 used for encryption and decoding, etc., in the record 231.

The volume setting unit 312 associates information for identifying the bands #00, #10, and #20 set in the SEDs 201a to 210c, respectively, with information indicative of the physical storage region of the LUN #00 in the SEDs 201a to 210c, respectively, and registers the information in the LV management table 330.

Similarly, when setting LUN #01 that spans the SEDs 210a to 210c, the volume setting unit 312 requests the SEDs 210a to 210c, respectively, to set the band #01 and bands #11 and #21, respectively, in the regions of the physical storage regions of the LUN #01, which are included in the SEDs 210a, 210b, and 210c, respectively. Then, the volume setting unit 312 associates information for identifying the bands #01, #11, and #21 set in the SEDs 210a to 210c, respectively, with information indicative of the physical storage region of the LUN #01 in the SEDs 210a to 210c, respectively, and registers the information in the LV management table 330.

Similarly, when setting LUN #02 that spans the SEDs 210a to 210c, the volume setting unit 312 requests the SEDs 210a to 210c, respectively, to set bands #02, #12, and #22, respectively, in the regions of the physical storage region of the LUN #02, which are included in the SEDs 210a, 210b, and 210c, respectively. Then, the volume setting unit 312 associates information for identifying the bands #02, #12, and #22 set in the SEDs 210a to 210c, respectively, with information indicative of the physical storage region of the LUN #02 in the SEDs 210a to 210c, respectively, and registers the information in the LV management table 330.

Due to the logical volume setting processing by the volume setting unit 312 described above, even when a logical volume is set so as to span a plurality of SEDs, it is made possible to completely erase data in a brief time for each logical volume. For example, when completely erasing the LUN #00, the secure erase controller 313 of the controller module 300a (see FIG. 8) requests the SEDs 210a, 210b, and 210c in which the LUN #00 is included to change the encryption keys corresponding to the bands #00, #10, and #20, respectively.

The band manager 241 of the SED 210a having received the request to change the encryption key causes the encryption key generator 242 to generate a new encryption key and changes the encryption key X0 associated with the band #00 to the new encryption key. Due to this, the data in the region of the physical storage region of the SED 210a, which region is included in the LUN #00, is completely erased.

Similarly, the band manager 241 of the SED 210b having received the request to change the encryption key causes the encryption key generator 242 to generate a new encryption key and changes an encryption key X1 associated with the band #10 to the new encryption key. Due to this, the data in the region of the physical storage region of the SED 210b, which region is included in the LUN #10, is completely erased.

Similarly, the band manager 241 of the SED 210c having received the request to change the encryption key causes the encryption key generator 242 to generate a new encryption key and changes an encryption key X2 associated with the band #20 to the new encryption key. Due to this, the data in the region of the physical storage region of the SED 210c, which region is included in the LUN #20, is completely erased.

Figure 10:
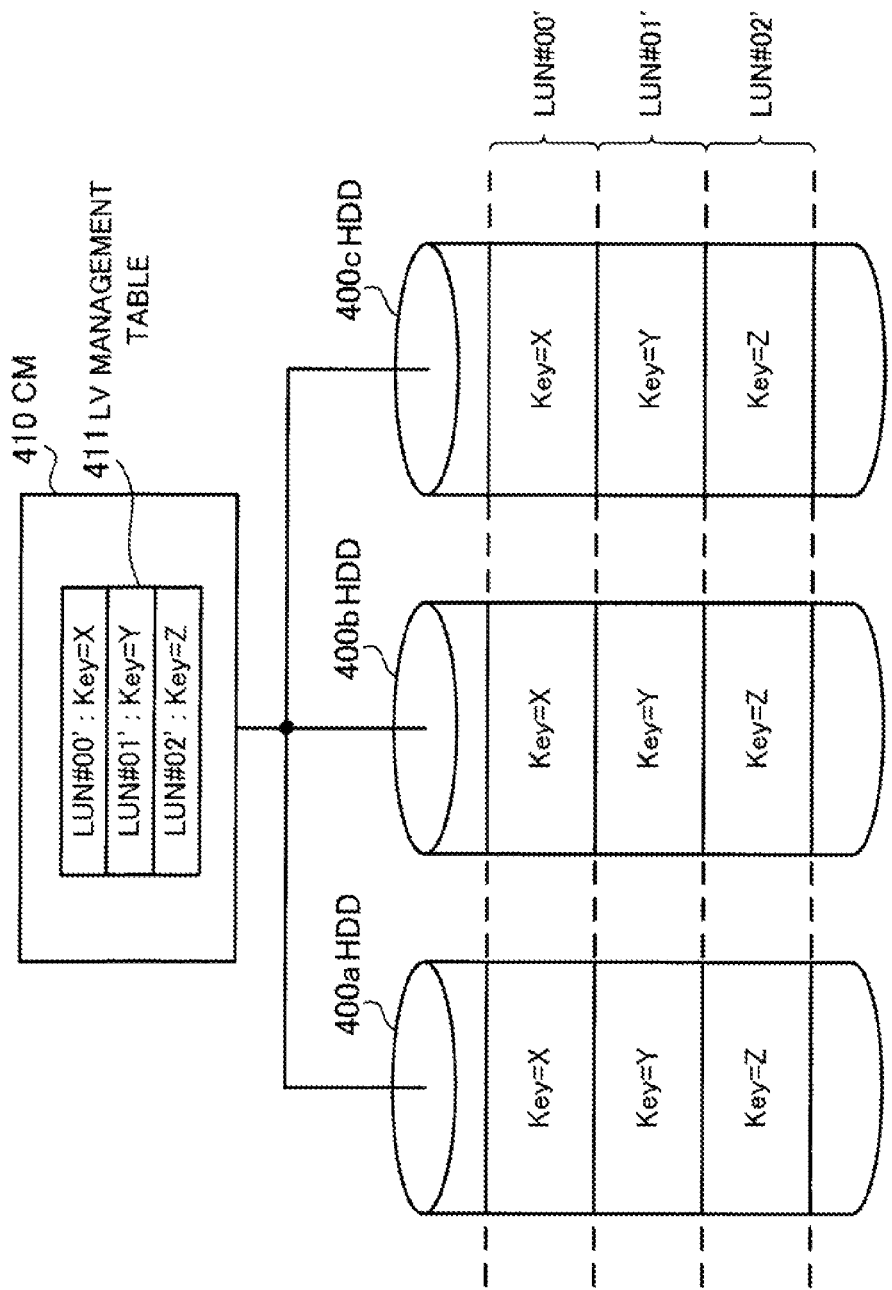
FIG. 10 illustrates a reference diagram of processing of setting logical volumes spanning a plurality of HDDs not having an encryption key generating function.

Here, FIG. 10 is a reference diagram of processing of setting logical volumes spanning a plurality of HDDs not having the encryption key generating function.

HDDs 400a to 400c illustrated in FIG. 10 are storage apparatuses not having the self encrypting function or the encryption key generating function. A controller module 410 has a function to generate an encryption key and encode data to be recorded in the HDDs 400a to 400c, respectively, using the generated encryption key. In the system having such a configuration, processing of the controller module 410 of generating a logical volume that spans the HDDs 400a to 400c is considered.

For example, when setting LUN #00' that spans the HDDs 400a to 400c, the controller module 410 registers information indicative of the setting region of the LUN #00' in the HDDs 400a to 400c, respectively, and an encryption key X used for encryption of data to be recorded in the LUN #00' in an LV management table 411. After that, the controller module 410 encrypts data to be recorded in the LUN #00' regardless of the recording destination being any of the HDDs 400a to 400c using the encryption key X. Further, the controller module 410 decodes data read from the LUN #00' using the encryption key X.

Similarly, when setting LUN #01' that spans the HDDs 400a to 400c, the controller module 410 registers information indicative of the setting region of the LUN #01' in the HDDs 400a to 400c, respectively, and an encryption key Y used for encryption of data to be recorded in the LUN #01' in the LV management table 411. After that, the controller module 410 encrypts data to be recorded in the LUN #01' regardless of the recording destination being any of the HDDs 400a to 400c using the encryption key Y. Further, the controller module 410 decodes data read from the LUN #01' using the encryption key Y.

Similarly, when setting LUN #02' that spans the HDDs 400a to 400c, the controller module 410 registers information indicative of the setting region of the LUN #02' in the HDDs 400a to 400c, respectively, and an encryption key Z used for encryption of data to be recorded in the LUN #02' in the LV management table 411. After that, the controller module 410 encrypts data to be recorded in the LUN #02' regardless of the recording destination being any of the HDDs 400a to 400c using the encryption key Z. Further, the controller module 410 decodes data read from the LUN #02' using the encryption key Z.

Due to the logical volume setting processing by the controller module 410 described above, it is made possible to completely erase data in a brief time for each logical volume even when a logical volume is set so as to span a plurality of HDDs. For example, when completely erasing the LUN #00', the controller module 410 changes the encryption key X used for encryption and decoding of the LUN #00' to a new encryption key and registers the new encryption key in the LV management table 411.

As described above, when the controller module 410 generates an encryption key and performs encryption and decoding, it is sufficient for the controller module 410 to manage the logical volume and the encryption key associated with each other and the HDDs do not need any settings.

On the other hand, in the storage system 100 in the present embodiment, because the SED has the encryption key generating function, and therefore, it is not possible to perform processing of completely erasing data in a brief time for each logical volume based on only the information managed by the controller module as in the example of FIG. 10. Consequently, as explained in FIG. 9, the controller module 300a of the present embodiment requests the SED included in the physical storage region of the logical volume to set a band in the region in which the logical volume is included. When the logical volume spans a plurality of SEDs, the controller module 300a requests each of the SEDs to set a band in the region in which the logical volume is included.

By such a setting request as described above, the region that agrees with the physical storage region of the logical volume managed by the controller module 300a using the LV management table 330 is also managed by the SED as a band registered in the band management table 230. Then, by the controller module 300a requesting the SED included in the physical storage region of the logical volume to be erased to change the encryption key of the band corresponding to the logical volume to be erased, it is made possible to completely erase data in a brief time for each logical volume.

Figure 11:
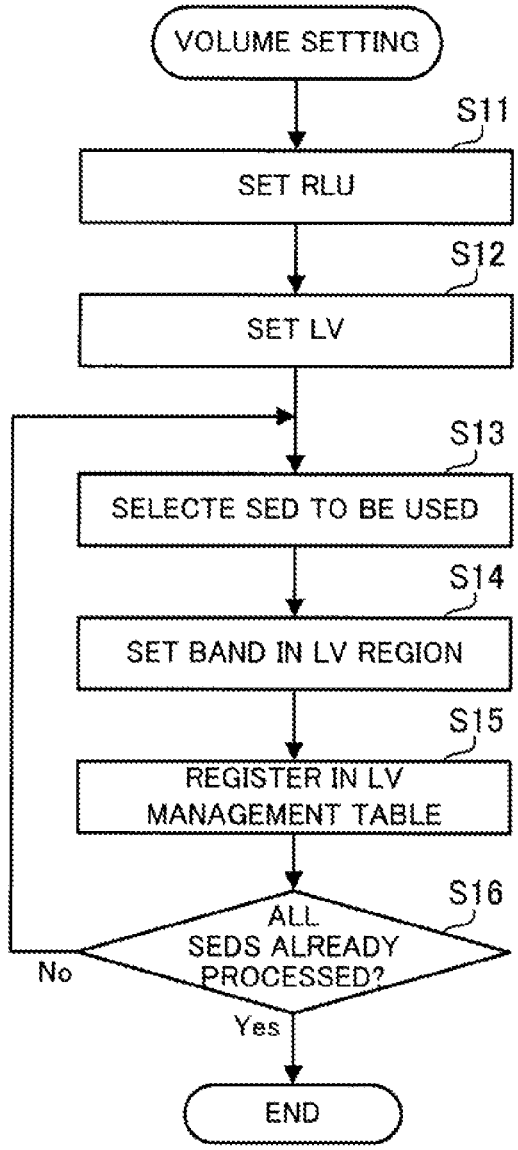
FIG. 11 is a flowchart of an example of a volume setting processing procedure.

FIG. 11 is a flowchart of an example of a procedure of volume setting processing.

(Step S11) The volume setting unit 312 of the controller module 300a sets an RLU in response to a request from the management terminal 130.

The volume setting unit 312 generates the new record 321 in the RAID management table 320. The volume setting unit 312 receives specification about the RAID level, the SED to be used, and the size of the setting region of the RLU for each SED. The volume setting unit 312 registers the specified RAID level and the SED to be used in each box of "RAID level" and "Used drive" of the generated record 321.

The volume setting unit 312 secures the physical storage region the size specified by the management terminal 130 in each SED to be used. At this time, it is sufficient to secure the physical storage having the same size in each SED. The volume setting unit 312 registers the top address and size of the region secured in each SED in the boxes of "Top address" and "Length" corresponding to each SED within the record 321 newly generated.

(Step S12) The volume setting unit 312 sets a logical volume in response to a request from the management terminal 130.

The volume setting unit 312 registers identification information of a logical volume (LUN) to be set newly in the record 321 generated in the RAID management table 320 at step S11. Further, the volume setting unit 312 generates the record 331 corresponding to the logical volume registered in the record 321 in the LV management table 330.

The volume setting unit 312 extracts identification information of the SED registered in "Used drive" from the record 321 set in the RAID management table 320 at step S11. The volume setting unit 312 creates registration boxes of information about the SED corresponding to each piece of identification information of the SED extracted from the RAID management table 320.

The volume setting unit 312 receives specification of the size of the logical volume to be secured in each SED extracted from the RAID management table 320 from the management terminal 130. The volume setting unit 312 secures the physical storage region with the size specified by the management terminal 130 in each SED. At this time, the volume setting unit 312 secures the forefront of the empty region in which no logical volume is set of the physical storage region indicated by "Top address" and "Length" within the record 321 generated in the RAID management table 320 at step S11 as a region of the logical volume for each SED. The volume setting unit 312 registers the top address and size of the region secured in each SED in the boxes of "Top address" and "Length" corresponding to each SED within the record 331 generated in the LV management table 330.

(Step S13) The volume setting unit 312 selects one SED from the record 331 generated in the LV management table 330 at step S12.

(Step S14) The volume setting unit 312 requests the SED selected at step S13 to set a band in the region corresponding to the logical volume.

The volume setting unit 312 reads each registered value of "Top address" and "Length" about the SED selected at step S13 from the record 331 generated in the LV management table 330 at step S12. The volume setting unit 312 transmits the registered values of "Top address" and "Length" read from the LV management table 330 to the SED selected at step S13 and requests the SED to set a band in the region indicated by "Top address" and "Length".

The band manager 241 of the SED having received the setting request generates the new records 231 in the band management table 230. The band manager 241 registers each value of "Top address" and "Length" received from the volume setting unit 312 in the boxes of "Top address" and "Length" of the record 231 newly generated.

Further, the band manager 241 registers the encryption key used for encryption and decoding in the band in the box of "Encryption key" of the record 231 newly generated. At this time, the encryption key to be registered is the same as the encryption key used before the setting in the region in which the band is set newly. For example, when a new band is set in the region of the global band, the encryption key of the global band is registered as an encryption key of the new band.

(Step S15) The band manager 241 of the SED transmits band identification information added to the record 231 generated newly at step S14 to the volume setting unit 312 of the controller module 300a. The volume setting unit 312 registers the band identification information received from the band manager 241 in the box of "Band identification information" corresponding to the SED selected at step S13 of the registration boxes of the record 331 generated in the LV management table 330 at step S12.

Although not illustrated schematically, the volume setting unit 312 may further make setting of the automatic lock operation for the band set at step S14 and setting of the authentication key to release the lock state based on a request from the management terminal 130. Upon receipt of a request for the application of the automatic lock operation and the authentication key from the management terminal 130, the volume setting unit 312 registers the authentication key received from the management terminal 130 in the box of "Authentication key" corresponding to the SED selected at step S13 of the registration boxes of the record 331 generated in the LV management table 330 at step S12. Further, the volume setting unit 312 transmits the authentication key received from the management terminal 130 to the SED selected at step S13 and requests the SED to enable the automatic lock operation. The band manager 241 of the SED having received the request updates the value of "Lock enable" from the initial value "0" to "1" and at the same time, hashes and registers the authentication key received from the controller module 330a in the record 231 generated in the band management table 230 at step S14.

Processing of enabling or disabling the automatic lock operation may also be performed at any timing after the initial setting processing of the logical volume illustrated in FIG. 11 is performed.

(Step S16) The volume setting unit 312 determines whether all the SEDs registered in the record 331 generated in the logical volume management table 330 at step S12 have already been subjected to the processing. When there exists an SED not having been subjected to the processing yet (S16: No), the procedure returns to step S13 and the volume setting unit 312 selects one SED registered in the record 331 but not having been subjected to the processing. On the other hand, when all the SEDs have already been subjected to the processing, (S16: Yes), the volume setting processing is exited.

According to the processing of FIG. 11 described above, when the logical volume is set in one SED, the processing at steps S13 to S16 is performed once and the band corresponding to the physical storage region of the logical volume is set in one SED, which is the setting destination. At the same time, in the record 331 generated newly in the LV management table 330, only one piece of band identification information is registered.

When a logical volume is set so as to span a plurality of SEDs, the processing at steps S13 to S16 is performed repeatedly the number of times corresponding to the number of SEDs included in the logical volume. In this case, the band is set in each SED included in the logical volume and at the same time, in the record 331 generated newly in the LV management table 330, the band identification information is registered in the number of pieces corresponding to the number of SEDs.

In FIG. 11, the case is described where a logical volume is set following the setting of the RLU, but, it may also be possible to add a logical volume in the set RLU at any timing after the setting of the RLU. In this case, the processing at steps S12 to S16 is performed. At step S12, the region of the logical volume is secured in order from the side nearer to the forefront of the region of each SED in which the RLU is set. Further, in the box of "Logical volume" of each record 321 of the RAID management table 320, the logical volume that is set is registered in order from the side nearer to the forefront of the region of each SED in which the RLU is set.

Figure 12:
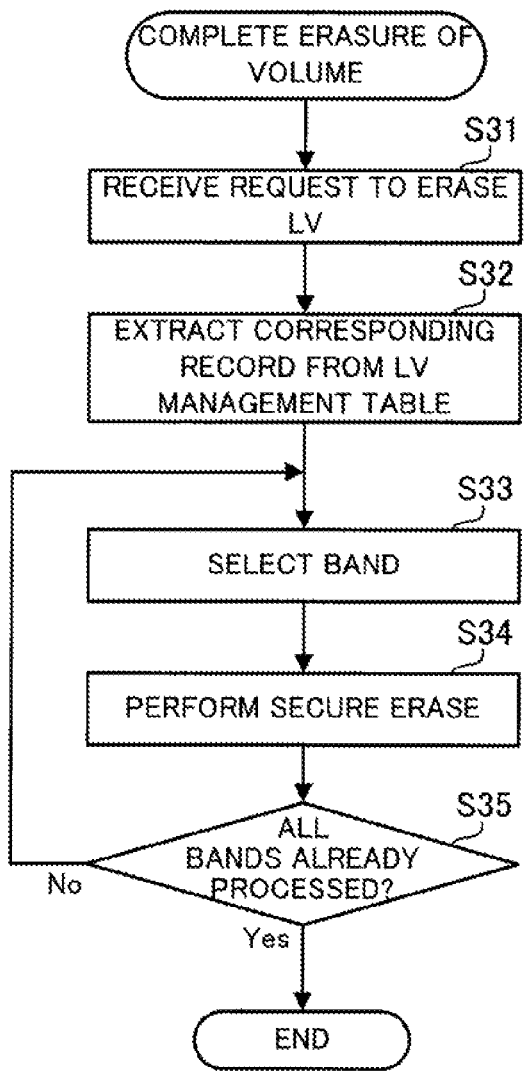
FIG. 12 is an example of a processing procedure when completely erasing a logical volume.

FIG. 12 is an example of a procedure of processing when completely erasing a logical volume.

(Step S31) The secure erase controller 313 of the controller module 330a receives specification of a logical volume and a request to completely erase the specified logical volume from the management terminal 130.

(Step S32) The secure erase controller 313 extracts the record 331 corresponding to the logical volume specified by the management terminal 130 from the LV management table 330.

(Step S33) The secure erase controller 313 selects one band indicated by "Band identification information" from the record 331 extracted from the LV management table 330 at step S32.

(Step S34) The secure erase controller 313 determines the SED associated with the identification information of the band selected at step S33 and transmits the identification information of the band to the determined SED and requests the SED to perform secure erase of the band. The band manager 241 of the SED having received the execution request causes the encryption key generator 242 to generate a new encryption key. The band manager 241 extracts the record 231 corresponding to the identification information of the band received from the secure erasure controller 313 from the band management table 230 and updates the value registered in "Encryption key" within the extracted record 231 to that of the encryption key newly generated. Due to this, the data recorded in the band corresponding to the extracted record 231 is completely erased.

(Step S35) The secure erasure controller 313 determines whether all the bands registered in the record 331 extracted from the LV management table 330 at step S32 have already been subjected to the processing. When there exists a band not having been subjected to the processing yet (S35: No), the procedure returns to step S33 and the secure erasure controller 313 selects one band registered in the record 331 but not having been subjected to the processing. On the other hand, when all the registered bands have been subjected to the processing (S35: Yes), the secure erasure controller 313 exits the processing.

According to the processing of FIG. 12, when the logical volume specified to be erased is set in one SED, the processing at steps S33 to S35 is performed only once and secure erase is performed in the band within the one SED corresponding to the specified logical volume. On the other hand, when the logical volume specified to be erased is set spanning a plurality of SEDs, the processing at steps S33 to S35 is performed the number of times corresponding to the number of SEDs included in the logical volume. In this case, secure erase is performed on the region of each SED of the physical storage region of the logical volume. Due to such processing, it is possible to completely erase data in a brief time for each logical volume also when the logical volume is set spanning a plurality of SEDs.

Next, LDE processing is explained. As described previously, LDE processing is processing of changing the configuration of RAID, such as the number of SEDs configuring the RLU, the capacity of the physical storage region configuring the RLU, and the RAID level.

Figure 13:
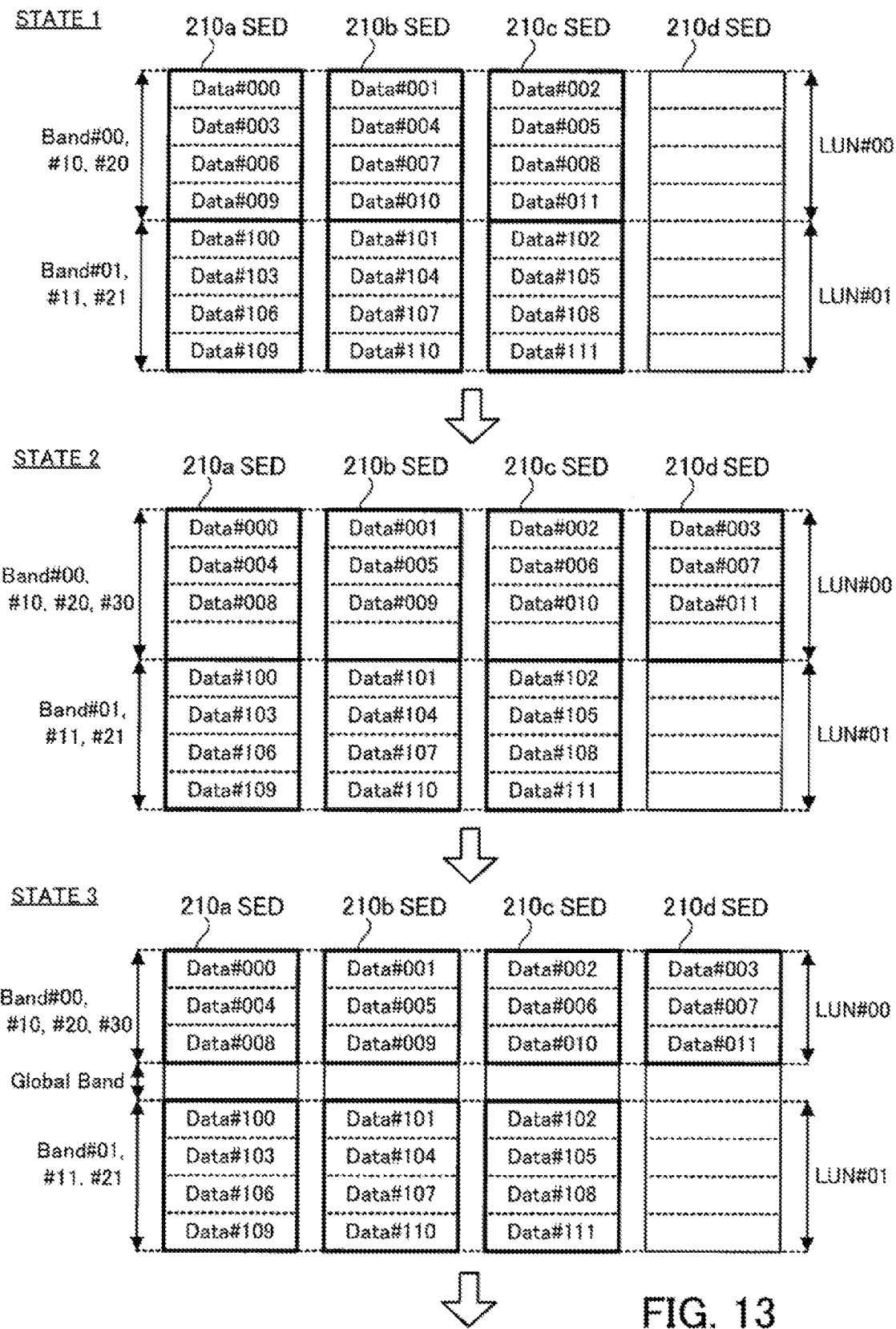
FIG. 13 is an example of LDE processing (No. 1)
Figure 14:
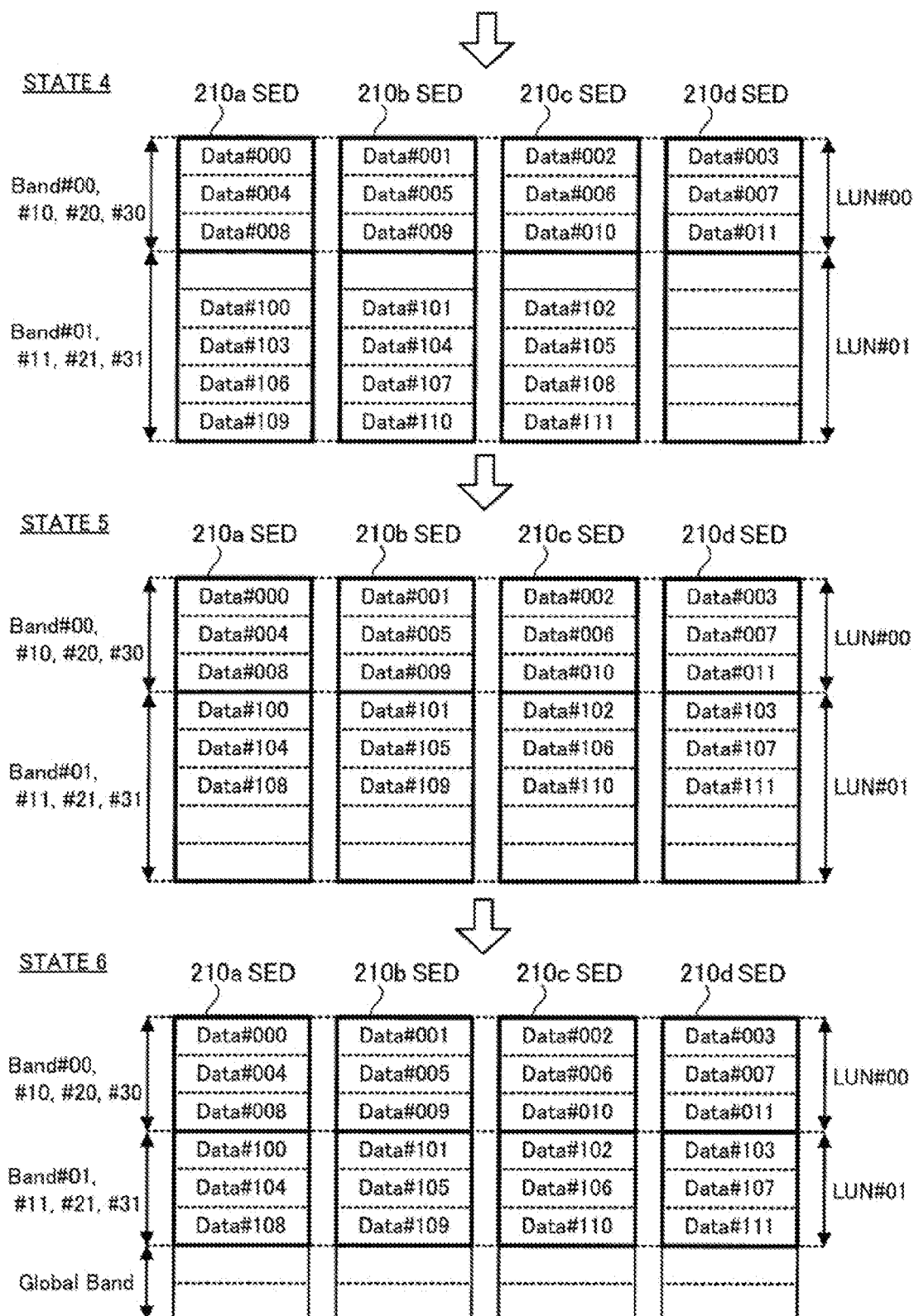
FIG. 14 is an example of LDE processing (No. 2)

FIG. 13 and FIG. 14 illustrate an example of LDE processing. FIG. 13 and FIG. 14 illustrate processing of increasing the number of SEDs configuring the RLU from "3" to "4" as an example of LDE processing. In the example of FIG. 13 and FIG. 14, it is assumed that the RAID level does not change from "0" and data #001 to #011, and #101 to #111 is encrypted striping data, respectively.

In "State 1" illustrated in FIG. 13, both the LUN #00 and the LUN #01 are set so as to span the SEDs 210a to 210c. In the region of the physical storage region of the LUN #00, which region is included in the SEDs 210a, 210b, and 210c, respectively, the bands #00, #10, and #20 are set, respectively. Further, in the region of the physical storage region of the LUN #01, which region is included in the SEDs 210a, 210b, and 210c, respectively, the bands #01, #11, and #21 are set, respectively. The LUNs #00 and #01 are included in the same RLU and the physical storage regions of the LUNs #00 and #01 neighbor each other in the SEDs 210a, 210b, and 210c, respectively.

It is assumed that processing of changing "State 1" described above, in which the SEDs configuring the RLU including the LUNs #00 and #01 are the three SEDs 210a to 210c, to a state in which the number of SEDs is four, that is, the SEDs 210a to 210d, is performed as LDE processing. In this case, the volume setting unit 312 of the controller module 300a sets the region of the LUN #00 in the SED 210d first and at the same time, requests the SED 210d to set a band in the range of the LUN #00. Due to this, in the SED 210d, band #30 is set.

Next, the volume setting unit 312 requests the RAID controller 311 to rearrange the data #000 to #011 included in the LUN #00 in the region of the expanded LUN #00. The RAID controller 311 moves the data #000 to #011 to the side nearer to the forefront of the region of the LUN #00 in the SEDs 210a to 210d, respectively. The state after the rearrangement of data is illustrated as "State 2" of FIG. 13. In the example of FIG. 13, the RAID level is not changed, and therefore, the number of pieces of data remains unchanged before and after the rearrangement. Because of this, empty regions are produced at the rear end of the region of the LUN #00 in the SEDs 210a to 210d, respectively.

Next, the volume setting unit 312 limits the setting range of the LUN #00 to the range (range including no empty region) in which data is rearranged. At the same time, the volume setting unit 312 requests the SEDs 210a, 210b, 210c, and 210d to limit the regions of the bands #00, #10, #20, and #30 in accordance with the setting region of the LUN #00, respectively. The state in which the bands #00, #10, #20, and #30 are limited, respectively, is illustrated in "State 3" of FIG. 13. The empty region produced by the rearrangement of data of the LUN #00 is changed into the global band in which it is possible to set another logical volume.

Next, the volume setting unit 312 expands the regions of the LUN #01 in the SEDs 210a to 210c, respectively, so as to include the empty regions produced by the rearrangement of data of the LUN #00. At the same time, the volume setting unit 312 requests the SEDs 210a, 210b, and 210c to expand the regions of the bands #01, #11, and #21, respectively, in accordance with the setting region of the LUN #01. Next, the volume setting unit 312 sets the region of the LUN #01 in the SED 210d. At this time, the size of the region of the LUN #01 to be set in the SEDs 210d is made the same as that of the setting region of the LUN #01 in the SEDs 210a to 210c, respectively. Further, the volume setting unit 312 requests the SED 210d to set a band in the range of the LUN #01. Due to this, band #31 is set in the SED 210d as illustrated in "State 4" of FIG. 14.

Next, the volume setting unit 312 requests the RAID controller 311 to rearrange the data #100 to #111 included in the LUN #01 in the region of the expanded LUN #01. The RAID controller 311 moves the data #100 to #111 to the side nearer to the forefront of the region of the LUN #01 in the SEDs 210a to 210d, respectively. The state after the rearrangement of data is illustrated as "State 5" of FIG. 14. As in "State 5", empty regions are produced at the rear end of the region of LUN #01 in the SEDs 210a to 210d, respectively.

Next, the volume setting unit 312 limits the setting range of the LUN #01 to the range (range including no empty region) in which data is rearranged. At the same time, the volume setting unit 312 requests the SEDs 210a, 210b, 210c, and 210d to limit the regions of the bands #01, #11, #21, and #31 in accordance with the setting region of the LUN #01, respectively. The state in which the bands #01, #11, #21, and #31 are limited, respectively, is illustrated in "State 6" of FIG. 14. The empty region produced by the rearrangement of data of the LUN #00 is changed into the global band in which it is possible to set another logical volume.

By the processing from "State 4" to "State 6" in FIG. 14, the setting range of the LUN #01 moves. By this moving processing, as illustrated in "State 4", before the movement of data of the LUN #01 is started, the regions of the bands #01, #11, and #21 included in the LUN #01 are expanded for the empty regions produced by the rearrangement of data of the LUN #00.

If data of the LUN #01 is moved before the region expansion of the bands #01, #11, and #21, the data #100 to #102 of the LUN #01 moved to the empty regions produced by the rearrangement of data of the LUN #00 (see "State 5") are encrypted using an encryption key different from that of the data included in the bands #01, #11, and #21. Because of this, it is no longer possible to completely erase data of the LUN #01 at a time. In contrast to this, by moving data of the LUN #01 after expanding the regions of the bands #01, #11, and #21, it is made possible to completely erase data of the LUN #01 at a time.

Figure 15:
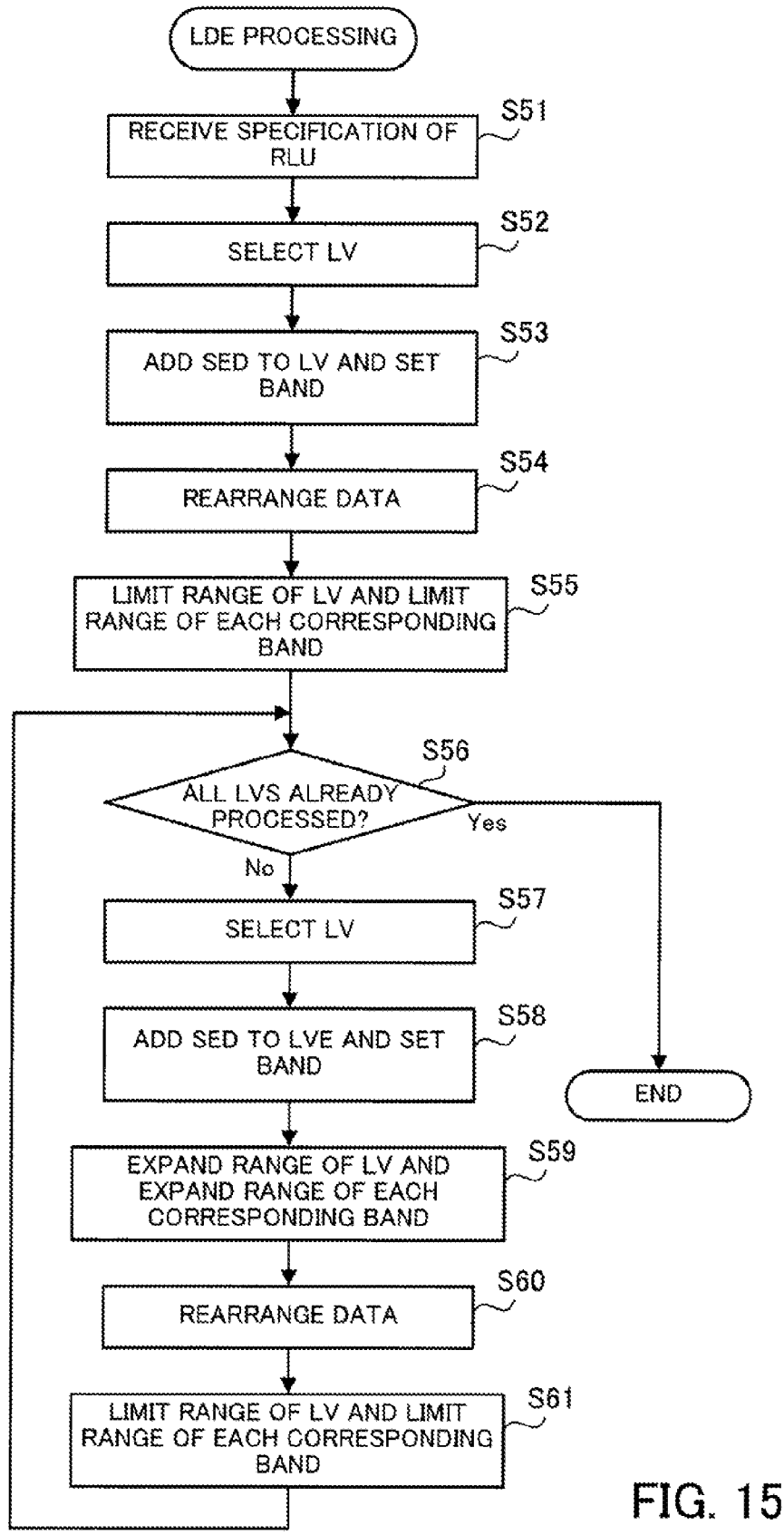
FIG. 15 is a flowchart of an example of an LDE processing procedure when increasing the number of SEDs included in an RLU.

FIG. 15 is a flowchart of an example of an LDE processing procedure when increasing the number of SEDs included in the RLU.

(Step S51) The volume setting unit 312 receives a request for LED processing from the management terminal 130 and at the same time, receives specification of the RLU to be subjected to LDE processing. Further, the volume setting unit 312 also receives specification of SED to be newly included as the physical storage region configuring the specified RLU.

(Step S52) The volume setting unit 312 extracts the record 321 of the RLU specified to be subjected to LDE processing from the RAID management table 320. The volume setting unit 312 selects the top logical volume from the box of "Logical volume" of the extracted record 321.

(Step S53) The volume setting unit 312 adds the new SED specified by the management terminal 130 at step S51 to the logical volume selected at step S52. Specifically, the volume setting unit 312 extracts the record 331 of the logical volume selected at step S52 from the LV management table 330. The volume setting unit 312 registers "Top address" and "Length" about the new SED in the extracted record 331. Here, the value registered in the box of "Length" is set to the same value as that of "Length" of another SED within the same record 331.

Further, the volume setting unit 312 requests the new SED to set a band in the region corresponding to the logical volume. At this time, the volume setting unit 312 reads each of the registered values of "Top address" and "Length" about the new SED registered in the record 331 extracted from the LV management table 330 and transmits them to the new SED.

The band manager 241 of the SED having received the setting request generates the new record 231 in the band management table 230. The band manager 241 registers each value of "Top address" and "Length" received from the volume setting unit 312 in the boxes of "Top address" and "Length" of the record 231 newly generated. The band manager 241 causes the encryption key generator 242 to generate an encryption key and registers the generated encryption key in the box of "Encryption key" of the record 231 newly generated.

(Step S54) The volume setting unit 312 requests the RAID controller 311 to rearrange data in the logical volume expanded at step S53. For example, when the RAID level does not change from "0" as in FIG. 13 and FIG. 14, the RAID controller 311 temporarily moves data recorded currently in the logical volume selected at step S52 to the RAM 302 within the controller module 300a and then writes the moved data from the side nearer to the forefront with no space left in between into the region of the logical volume expanded at step S53.

In the data rearrangement at step S54, there may be a case where recalculation of parity data is performed depending on the RAID level and the number of SEDs before and after the change, in addition to only the movement of data. When recalculation of parity data is necessary, the RAID controller 311 recalculates parity data and allocates the calculated parity data and data on which calculation is based to an appropriate SED of the SEDs in which the logical volume is set.

(Step S55) The processing of step S55 is performed when the empty region is produced at the rear end of the region of each SED of the logical volume to be subjected to the processing by the data rearrangement of step S54. The volume setting unit 312 limits the setting region of the logical volume in each SED so as to exclude the empty region. At this time, the volume setting unit 312 reduces the value of "Length" about each SED of information registered in the record 331 of the LV management table 330 selected at step S52 so that the empty region is not included.

Further, the volume setting unit 312 requests each SED in which the logical volume to be subjected to the processing is included to limit the setting range of the band also in accordance with the setting range of the logical volume. At this time, the volume setting unit 312 transmits the value updated in "Length" of the record 331 of the LV management table 330 to each SED. The band manager 241 of each SED having received the request to limit the band setting range updates the registered value of "Length" to the value received from the volume setting unit 312 in the record 231 of the corresponding band within the band management table 230. Due to this, the rear end of the region of the band in each SED moves to the side nearer to the forefront and the empty region in which no band is set is changed into the global band.

(Step S56) The volume setting unit 312 determines whether all the logical volumes registered in the "Logical volume" box of the record 331 extracted from the RAID management table 320 at step S52 have already been subjected to the processing. When there exists a logical volume not having been subjected to the processing yet (S56: No), the volume setting unit 312 performs the processing of step S57. On the other hand, when all the logical volumes have been subjected to the processing (S56: Yes), the volume setting unit 312 exits the LDE processing.

(Step S57) The volume setting unit 312 selects the top logical volume of the logical volumes registered in the "Logical volume" box of the record 331 extracted from the RAID management table 320 at step S52 but not having been subjected to the processing.

(Step S58) The volume setting unit 312 adds the new SED specified by the management terminal 130 at step S51 to the logical volume selected at step S57. Specifically, the volume setting unit 312 extracts the record 331 of the logical volume selected at step S57 from the LV management table 330. The volume setting unit 312 registers "Top address" and "Length" about the new SED in the extracted record 331. Here, the value registered in the box of "Length" is set to the same value as that of "Length" about another SED within the same record 331.

The volume setting unit 312 further requests the new SED to set a band in the region corresponding to the logical volume. At this time, the volume setting unit 312 reads each registered value of "Top address" and "Length" about the new SED registered in the record 331 extracted from the LV management table 330 and transmits them to the new SED.

The band manager 241 of the SED having received the setting request sets a band in the region indicated by "Top address" and "Length" received from the volume setting unit 312 by the same procedure as that of step S53.

(Step S59) This step S59 is performed when the empty region (global band) is produced between the storage region of the logical volume having been subjected to the immediately previous processing and the storage region of the logical volume to be subjected to the current processing by the processing of the logical volume having been subjected to the immediately previous processing at step S55 or step S61. The volume setting unit 312 expands the region of the logical volume to be subjected to the processing for the empty region produced by the processing of the logical volume having been subjected to the immediately previous processing at step S55 or step S61 of the physical storage region of each SED in which the logical volume to be subjected to the processing is included. At this time, the volume setting unit 312 updates the value of "Top address" about each SED of the registered values of the record 331 extracted from the LV management table 330 at step S58 to the top address of the empty region.

Further, the volume setting unit 312 requests each SED in which the logical volume to be subjected to the processing is included to expand the setting range of the band also in accordance with the setting range of the logical volume. At this time, the volume setting unit 312 transmits the value updated in "Top address" of the record 331 of the LV management table 330 to each SED. The band manager 241 of each SED having received the request to expand the band setting range updates the registered value of "Top address" to the value received from the volume setting unit 312 in the record 231 of the corresponding band within the band management table 230. Due to this, the region of the band in each SED is expanded to the side nearer to the forefront.

(Step S60) The volume setting unit 312 requests the RAID controller 331 to rearrange data in the logical volume expanded at step S59. As at step S54 described previously, when the RAID level does not change from "0" as in FIG. 13 and FIG. 14, the RAID controller 331 writes the data currently recorded in the logical volume to be subjected to the processing into the region of the logical volume expanded at step S59 from the side nearer to the forefront with no space left in between after temporarily moving the data into the RAM 302 within the controller module 300a. When recalculation of parity data is necessary, the RAID controller 331 recalculates parity data and allocates the calculated parity data and the data on which calculation is based to each appropriate SED of the SEDs in which the logical volume is set.

(Step S61) The processing of step S61 is performed when the empty region is produced at the rear end of the region in each SED about the logical volume to be subjected to the processing by the data recalculation of step S60. The volume setting unit 312 limits the setting region of the logical volume to be subjected to the processing in each SED so that the empty region is not included by the same procedure as that of step S55. Further, the volume setting unit 312 requests each SED included in the logical volume to be subjected to the processing to limit the setting range of the band also in accordance with the setting region of the logical volume by the same procedure as that of step S55. In response to the request to limit the band setting region, the rear end of the region of the band in each SED moves to the side nearer to the forefront and the empty region in which no band is set is changed into the global band.

After this, the procedure returns to step S56 and the processing of steps S57 to S61 is repeated for all the logical volumes included in the RLU specified at step S51.

By the processing of steps S57 to S61 of the processing in FIG. 15 described above, the setting range of the logical volume in each SED may move to the side nearer to the forefront. When the setting range of the logical volume moves, the logical volume is expanded to the side nearer to the forefront at step S59 before data is rearranged at step S60 and at the same time, the range of the band within each SED corresponding to the expanded logical volume is also expanded to the side nearer to the forefront. Such region moving processing of the logical volume is performed, and thereby, also after the LDE processing, it is made possible to completely erase data in a brief time for each logical volume by the same procedure as that of FIG. 12.

Figure 16:
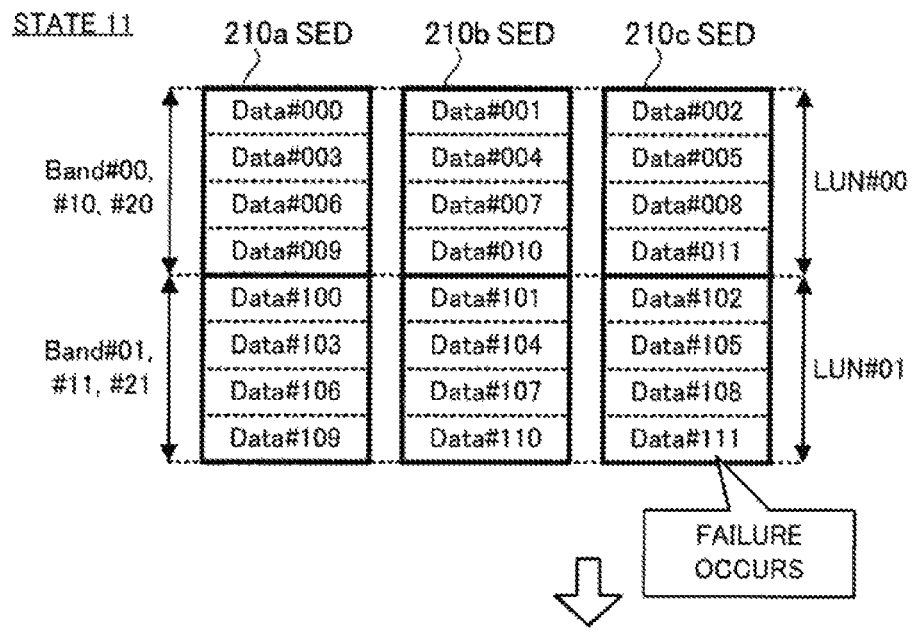
FIG. 16 is an example of rebuild and copy back processing (No. 1)
Figure 16:
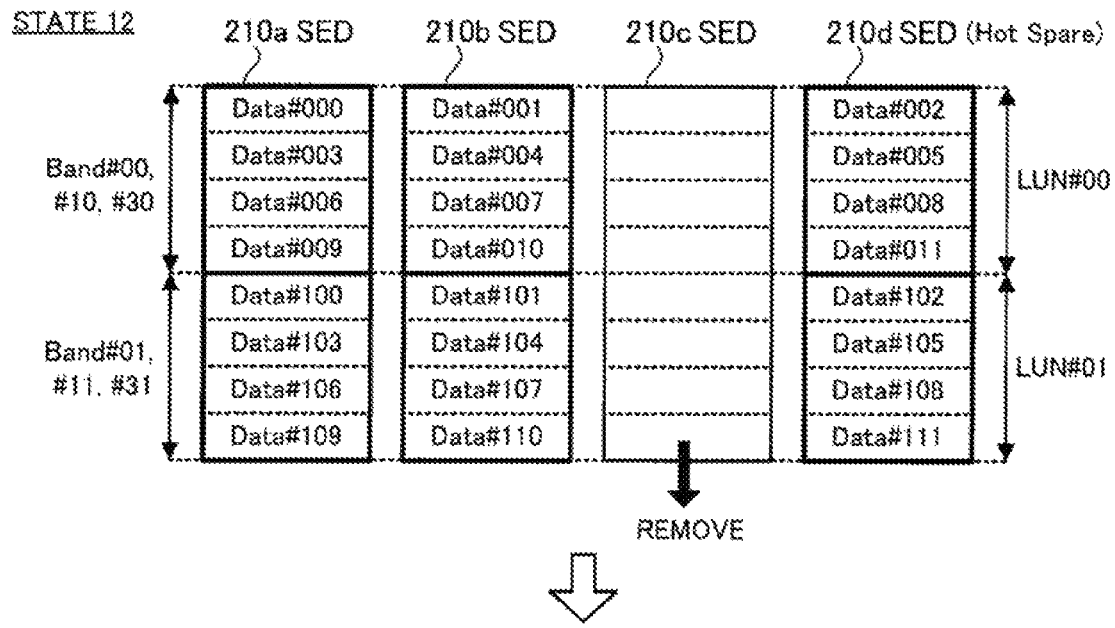

Next, FIG. 16 and FIG. 7 illustrate an example of rebuild and copy back processing.

As described previously, the rebuild processing is processing of generating, when any of SEDs configuring the RLU fails, the same data as that recorded in the failed SED and writing the data into a hot spare SED. The copy back processing is processing of writing back the data recorded in the hot spare SED into an SED put to use in place of the failed SED.

In "State 11" in FIG. 16, the LUNs #00 and #01 included in the same RLU are set so as to span the SEDs 210a to 210c. In the regions of the physical storage region of the LUN #00, which are included in the SEDs 210a, 210b, and 210c, respectively, the bands #00, #10, and #20 are set, respectively. Further, in the regions of the physical storage region of the LUN #01, which are included in the SEDs 210a, 210b, and 210c, respectively, the bands #01, #11, and #21 are set, respectively.

If the SED 210c in this "State 11" fails, the rebuild processing is performed using the hot spare SED 210d. First, the volume setting unit 312 of the controller module 300a sets the LUNs #00 and #01 with the same size as that of each region of the LUNs #00 and #01 within the SED 210c in the SED 210d. At the same time, the volume setting unit 312 requests the band manager 241 of the SED 210d to set the bands #30 and #31 in the regions corresponding to the LUNs #00 and #01 within the SED 210d.

After the setting of the bands #30 and #30 is finished, the volume setting unit 312 requests the RAID controller 311 to write the same data as that recorded in the LUNs #00 and #01, respectively, of the SED 210c into the regions of the LUNs #00 and #01 within the SED 210d. For example, when the data #002 is parity data based on the data #000 and #001, the RAID controller 311 calculates the data #002, which is parity data, based on the data #000 and #001 and writes the data into the SED 210d. Further, when the data #004 is parity data based on the data #003 and #005, the RAID controller 311 restores the data #005 based on the data #003 and the data #004, which is parity data, and writes the restored data #005 into the SED 210d.

When the write of data into the SED 210d is finished, the volume setting unit 312 releases the LUNs #00 and #01 and the bands #20 and #21 set in the SED 210c. When the release of setting is finished, as illustrated in "State 12" of FIG. 6, the failed SED 210c is taken out from the drive enclosure 200.

Figure 17:
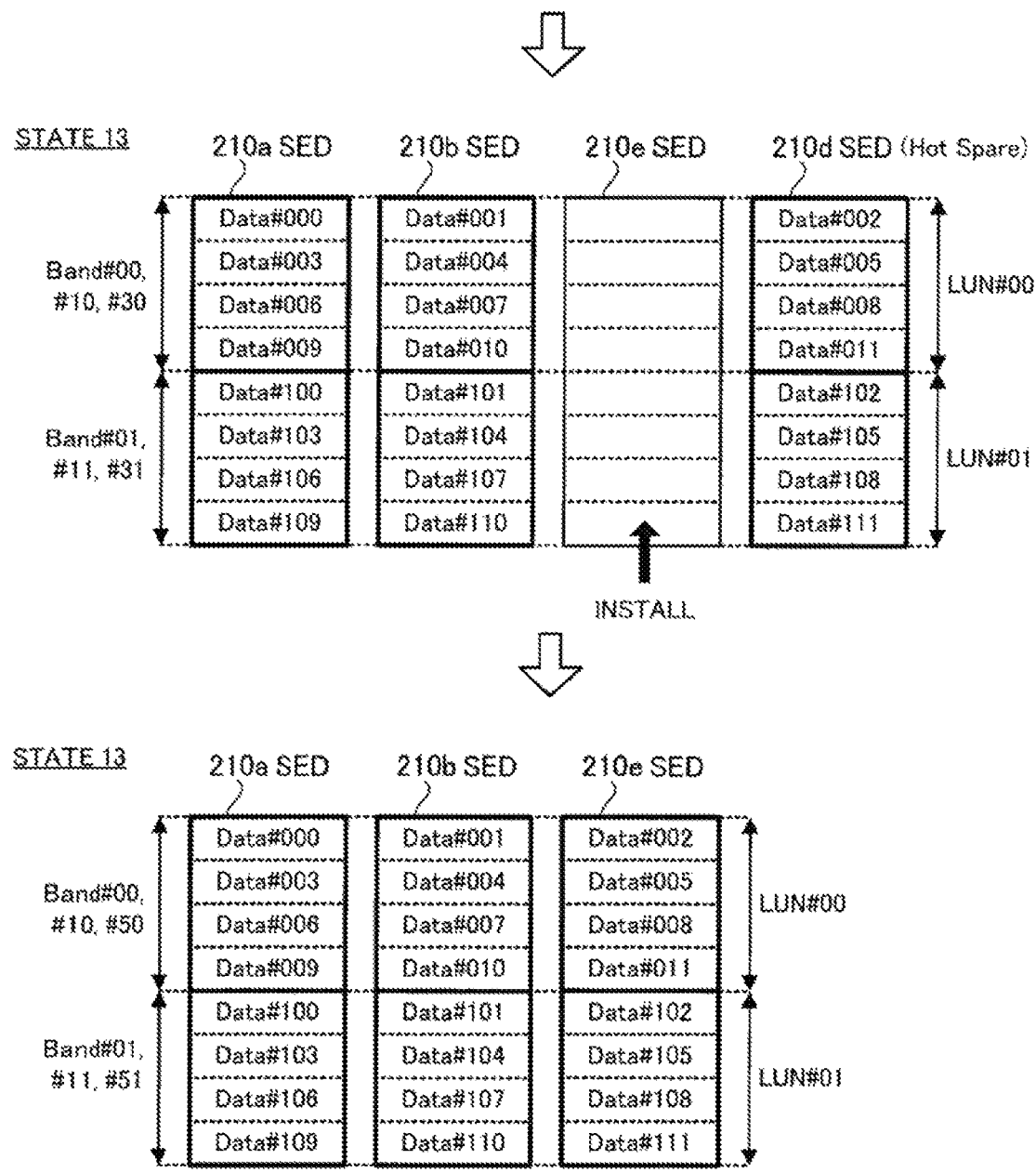
FIG. 17 is an example of rebuild and copy back processing (No. 2)

Next, as illustrated in "State 13" of FIG. 17, when the new SED 210e is installed in the drive enclosure 200, the copy back processing is started. The volume setting unit 312 of the controller module 300a sets the LUNs #00 and #01 having the same values as those in the setting of the LUNs #00 and #01 in the SED 210c that is taken out in the SED 210e. Further, the volume setting unit 312 sets bands #50 and #51 in each region of LUNs #00 and #01 in the SED 210e.

After that, the volume setting unit 312 writes back the data recorded in each region of LUNs #00 and #01 of the hot spare SED 210d into each region of the LUNs #00 and #01 of the SED 210e. After the write back is finished, the volume setting unit 312 releases the LUNs #00 and #01 and the bands #30 and #31 set in the SED 210d. After that, as illustrated in "State 13" of FIG. 17, the RAID operation is continued using the SEDs 210a, 210b, and 210e.

In the processing of FIG. 16 and FIG. 17, before data is written into another SED, the logical volume and band are set in the SED into which data is written before the data write. Due to this, it is made possible to completely erase data in a brief time for each volume in either of "State 12" after the rebuild processing is finished and "State 14" after the copy back processing is finished.

Third Embodiment

In the second embodiment described above, the lock controller 244 within an SED performs authentication processing with the controller module in response to the request from the authentication processor 314 for all the bands in which the automatic lock operation is enabled of the bands set in the SED when the power source of the SED is turned on. When the automatic lock operation is enabled in all the bands set in the SED, authentication processing is performed with the controller module for all the bands set in the SED when the power source of the SED is turned on.

In the second embodiment, one band is set in each storage region corresponding to one logical volume. Because of this, the number of bands that are set increases with the increasing number of logical volumes and as a result of that, the number of bands for which authentication processing needs to be performed with the controller module increases when the power source of the SED is turned on. The larger the number of bands for which authentication processing needs to be performed, the longer is the time needed from the operation to turn on the power source until access to the SED is allowed.

In order to address such a problem, in the third embodiment below, one band is set in each storage region corresponding to up to two logical volumes for each SED. Due to this, the time from the operation to turn on the power source until access to the SED is allowed is reduced by decreasing the number of bands set in each SED.

Figure 18:
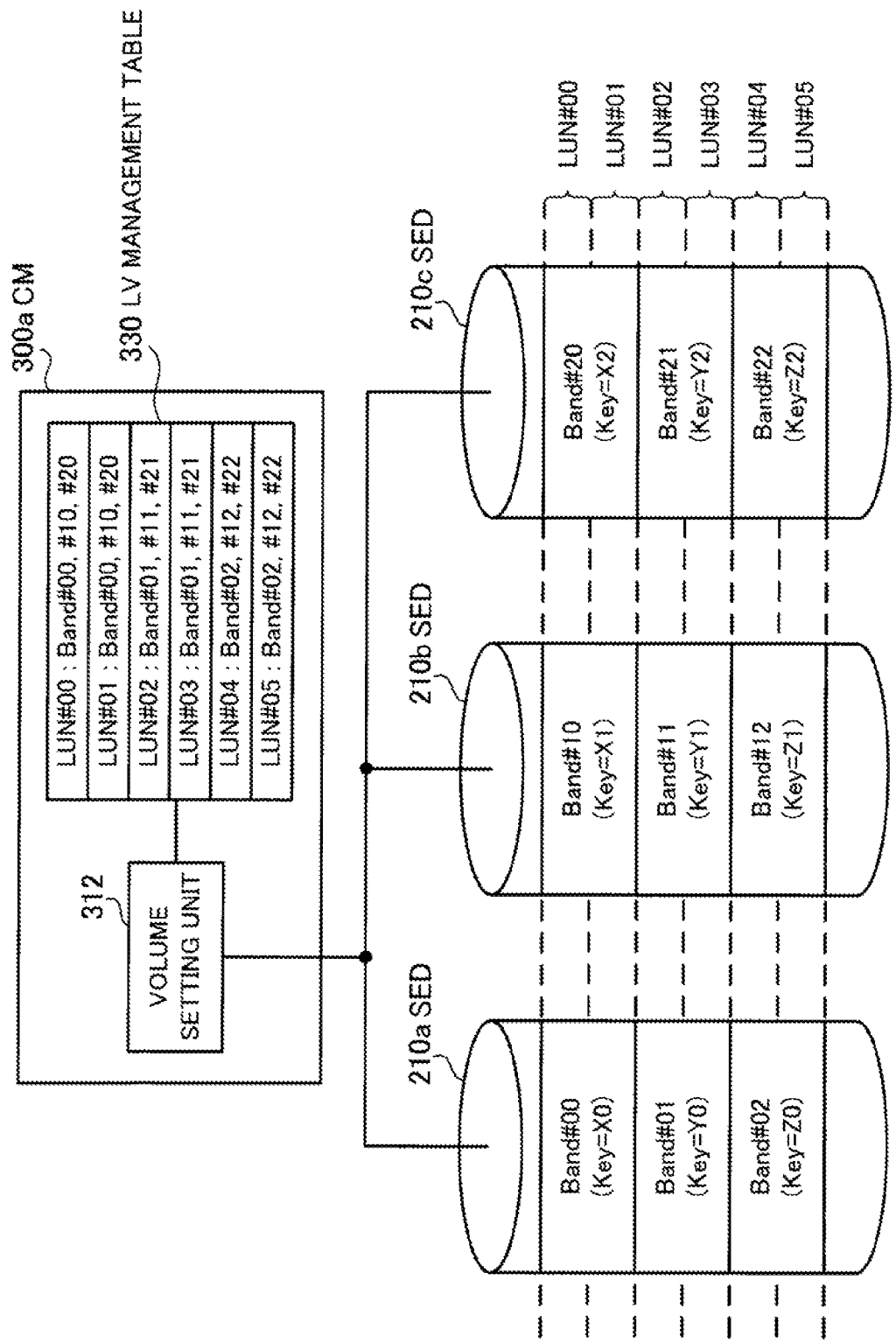
FIG. 18 is an example of processing of setting logical volumes in a third embodiment.

Hereinafter, a storage system according to the third embodiment is explained using the configuration of FIG. 4 and FIG. 8 and the table configuration of FIG. 5 and FIG. 7. FIG. 18 illustrates an example of processing of setting logical volumes in the third embodiment.

In the example of FIG. 18, six logical volumes LUNs, that is, the LUNs #00 and "01 and LUNs #02 to #05 are set spanning the SEDs 210a to 210c. It is assumed that the LUNs #00 to #05 are set in the same RLU.

The volume setting unit 312 of the controller module 300a sets one band in the storage region in which two neighboring logical volumes are included for each of the SEDs 210a to 210c. For example, in the setting region of the LUNs #00 and #01 in the SEDs 210a, 210b, and 210c, respectively, the bands #00, #10, and #20 are set, respectively. In the bands #00, #10, and #20, encryption and decoding are performed using the encryption keys X0, X1, and X2, respectively. In the setting region of the LUNs #02 and #03 in the SEDs 210a, 210b, and 210c, respectively, the bands #01, #11, and #21 are set, respectively. In the bands #01, #11, and #21, encryption and decoding are performed using the encryption key Y0 and encryption keys Y1 and Y2, respectively. In the setting region of the LUNs #04 and #05 in the SEDs 210a, 210b, and 210c, respectively, the bands #02, #12, and #22 are set, respectively. In the bands #02, #12, and #22, encryption and decoding are performed using the encryption key Z0 and encryption keys Z1 and Z2, respectively.

In the band management table 230 of each of the SEDs 210a to 210c, the record 231 is generated for each band as in FIG. 5 and the encryption key, the positional information of the band, etc., are registered in each record 231. As illustrated in FIG. 18, in each of the SEDs 210a to 210c, the bands in the number smaller than the number of set logical volumes are set, and thereby, the number of the records 231 generated in the band management table 230 decreases compared to the second embodiment and it is possible to reduce the storage capacity of the band management table 230.

On the other hand, in the LV management table 330 of the controller module 300a, the bands #00, #10, and #20 are registered in both the records 331 corresponding to the respective LUNs #00 and #01 (see FIG. 7). Similarly, the bands #01, #11, and #21 are registered in both the records 331 of the LV management table 330 corresponding to the respective LUNs #02 and #03. Further, the bands #02, #12, and #22 are registered in both the records 331 of the LV management table 330 corresponding to the respective LUNs #04 and #05.

Figure 19:
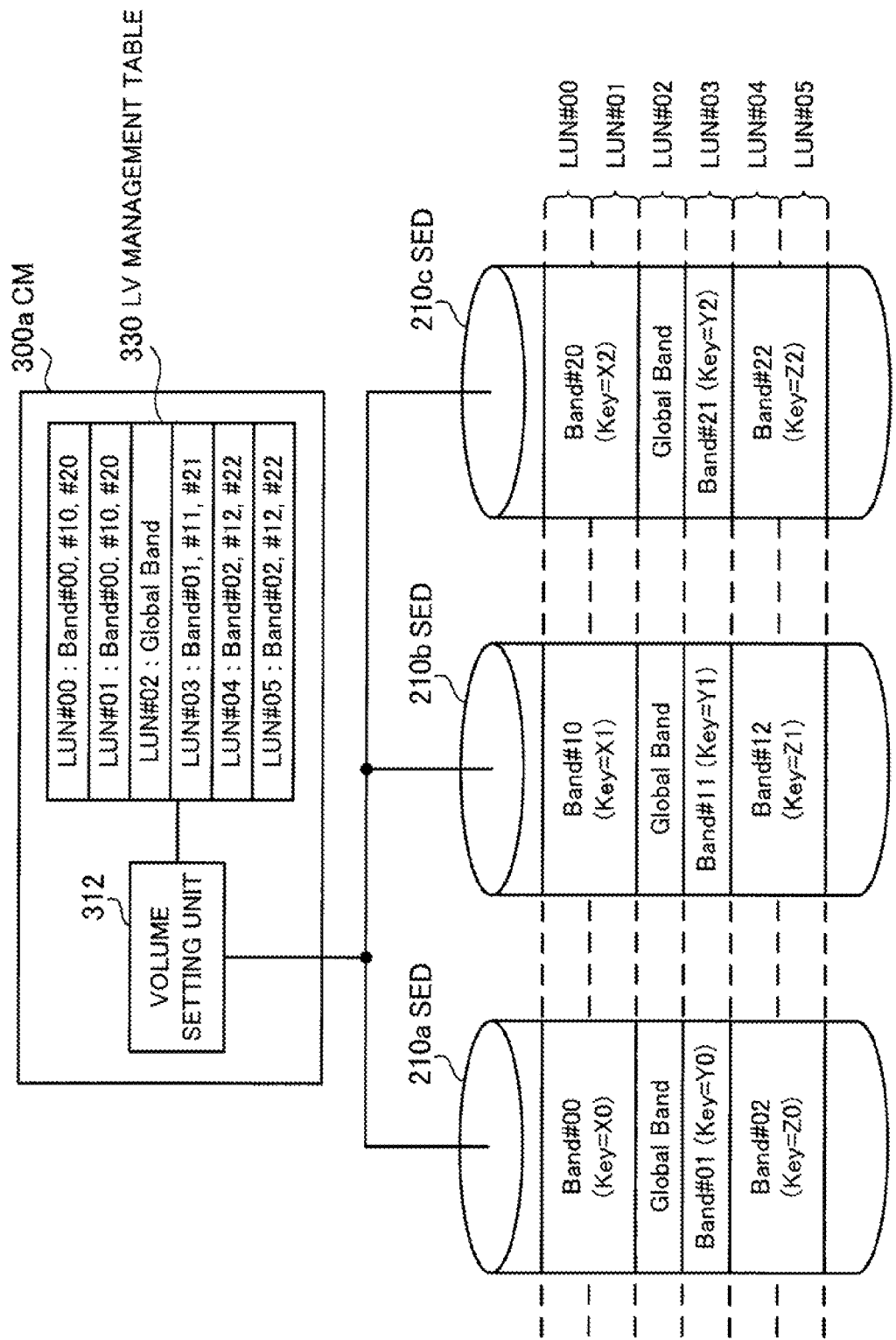
FIG. 19 is an example of processing of completely erasing data for each logical volume in the third embodiment.

FIG. 19 is an example of processing of completely erasing data for each logical volume in the third embodiment.

FIG. 19 illustrates processing of completely erasing data, for example, the data of the LUN #02 from the state where the LUNs #00 to #05 are set as in FIG. 18. When completely erasing the data of the LUN #02, the volume setting unit 312 requests each of the SEDs 210a, 210b, and 210c to limit the regions of the bands #01, #11, and #21 in which the region of the LUN #02 is included to the region excluding the LUN #02 (that is, the region including only the LUN #03). Specifically, the volume setting unit 312 requests each of the SEDs 210a, 210b, and 210c to change the top address of each region of the bands #01, #11, and #21 to the top address of the LUN #03 in each of the SEDs 210a, 210b, and 210c. Due to this, the region of the LUN #02 in each of the SEDs 210a to 210c is changed into the global band and the encryption key to be used is changed, and therefore, the data recorded in the LUN #02 previously is erased completely.

Although not illustrated schematically, when completely erasing the data of the LUN #03 from the state of FIG. 18, the regions of the bands #01, #11, and #21 are limited to the region excluding the LUN #03 (that is, the region including only the LUN #02). Due to this, the region of the LUN #03 is changed into the global band and the encryption key to be used is changed, and therefore, the data recorded in the LUN #03 previously is erased completely.

As described above, when one logical volume is to be erased in the state where one band is set in two neighboring logical volumes, the range of the band in which the logical volume to be erased is limited so as to exclude the region of the logical volume to be erased. By such processing, it is made possible to completely erase data in a brief time for each logical volume even when one band is set in two neighboring logical volumes.

For example, the region of the LUN #02 of FIG. 19 is changed into the global band in which the same encryption key as that used in other regions in which no band is set is used, and therefore, in this state, it is no longer possible to completely erase only the data recorded in the LUN #02 thereafter. But, as the LUN #02 of FIG. 19, as to the logical volume the data of which is completely erased and which has changed into the global band, it is also possible to restore the state where data may be completely erased for each logical volume thereafter. Hereinafter, to restore the logical volume that has changed into the global band into the state where it is possible to completely erase data for each logical volume is referred to "to restore to a band".

For example, when restoring the LUN #02 of FIG. 19 to a band, the volume setting unit 312 expands the bands #01, #11, and #21 neighboring the region of the LUN #02 in each of the SEDs 210a, 210b, and 210c so as to include the region of the LUN #02. Due to this, the region of the LUN #02 returns to the region of the band common to the LUN #03 as in FIG. 18 and it is made possible to completely erase only the LUN #02 thereafter.

Figure 20:
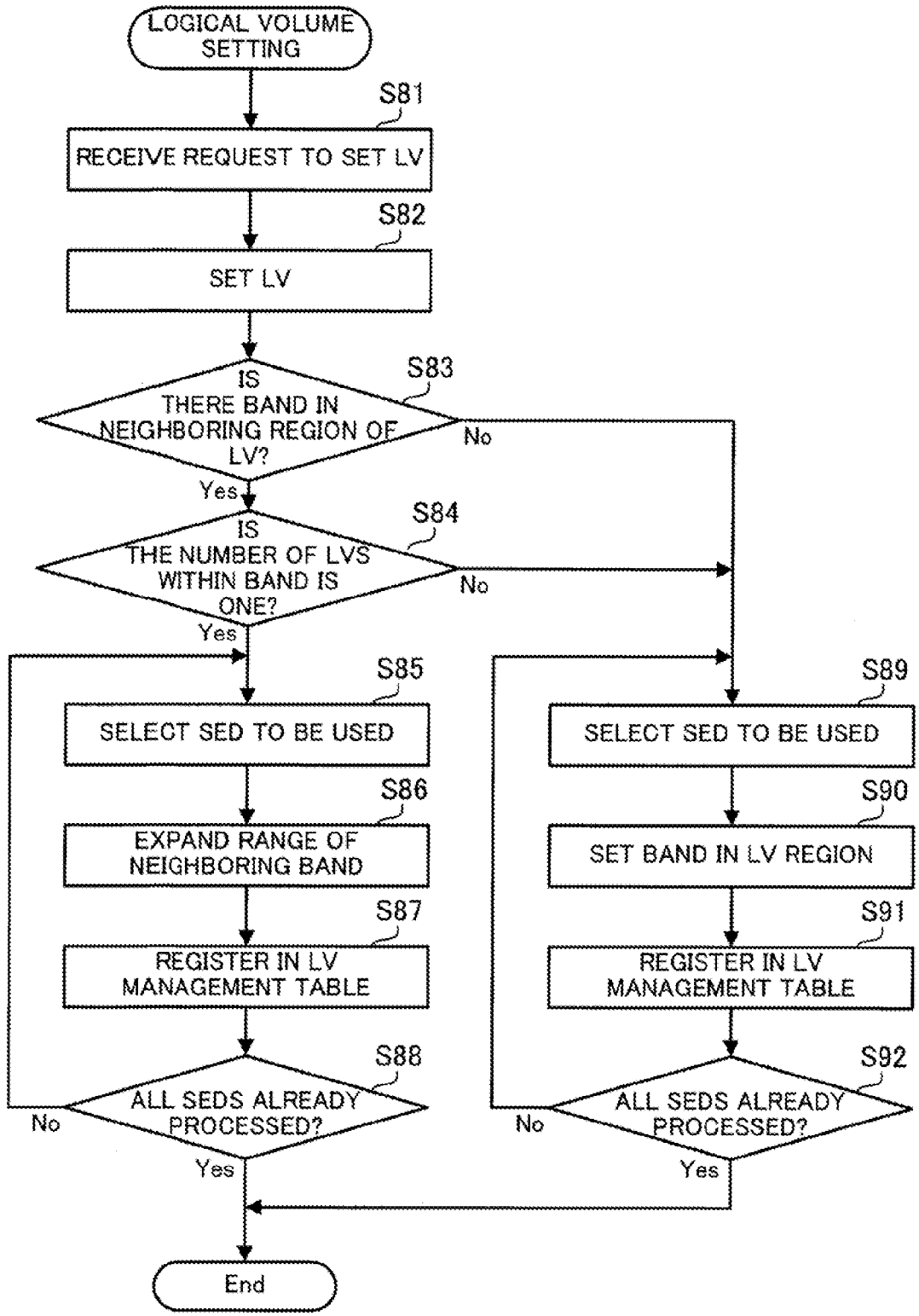
FIG. 20 is a flowchart of an example of a logical volume setting processing procedure in the third embodiment.

FIG. 20 is a flowchart of an example of a logical volume setting processing procedure in the third embodiment. The processing of FIG. 20 is performed at timing after the RLU is set by the procedure illustrated at step S11 of FIG. 11. But, the processing of FIG. 19 may be performed successively after the setting of the RLU.

(Step S81) The volume setting unit 312 of the controller module 300a receives the identification information of the RLU in which the logical volume is set and the specification of the size of the region of the logical volume to be set in each SED configuring the RLU as well as the request to set a new logical volume from the management terminal 130.

When the setting of a new logical volume is made successively after the setting of the RLU, at step S81, it is sufficient to receive only the specification of the size of the region of the logical volume to be set in each SED configuring the RLU.

At step S81, there is a case where it is requested by the management terminal 130 to restore the logical volume that has already been registered but changed into the global band after data is completely erased to the state where data may be completely erased for each logical volume (that is, to restore the logical volume to a band). In this case, the volume setting unit 312 receives specification of the logical volume to be restored from the management terminal 130.

(Step S82) The volume setting unit 312 extracts the record 321 of the RLU specified at step S81 from the RAID management table 320. The volume setting unit 312 registers identification information of the logical volume (LUN) to be set newly in the extracted record 321. Further, the volume setting unit 312 generates the record 331 corresponding to the logical volume registered in the record 321 in the LV management table 330.

The volume setting unit 312 extracts identification information of the SED registered in "Used drive" from the record 321 extracted from the RAID management table 320. The volume setting unit 312 creates a registration box of information about the SED corresponding to each piece of identification information of the SED extracted from the RAID management table 320 in the record 331 generated in the LV management table 330.

The volume setting unit 312 secures the physical storage region having the size specified by the management terminal 130 at step S81 in each SED. At this time, the volume setting unit 312 secures the forefront of the empty region in which no logical volume is set of the physical storage region indicated by "Top address" and "Length" within the record 321 extracted from the RAID management table 320 as the region of the logical volume for each SED. The volume setting unit 312 registers the top address and size of the region secured in each SED in the boxes of "Top address" and "Length" corresponding to each SED within the record 331 generated in the LV management table 330.

When restoration of the logical volume to a band is requested at step S81, the volume setting unit 312 only extracts the record 331 corresponding to the logical volume specified to be restored from the LV management table 330 at step S82.

(Step S83) The volume setting unit 312 determines whether a band including a region of another logical volume is set in the region adjacent to the logical volume set at step S82. The volume setting unit 312 determines that a band is set in the neighboring region when a band (not the global band) is set in "Band identification information" of the record 331 immediately previous or immediately after the record 331 generated at step S82 of the records 331 of the logical volume corresponding to the same RLU within the LV management table 330.

When a band is set in the neighboring region (S83: Yes), the volume setting unit 312 performs processing of step S84. On the other hand, when no band is set in the neighboring region (S83: No), the volume setting unit 312 performs processing of step S89.

(Step S84) The volume setting unit 312 determines whether the logical volume is set one or two in number in the band determined to neighbor the logical volume to be subjected to the processing at step S83. The volume setting unit 312 extracts the record 331 corresponding to the logical volume that neighbors the logical volume to be subjected to the processing and in which a band is set and the record 331 corresponding to the logical volume that further neighbors the logical volume in which a band is set from the LV management table 330.

The volume setting unit 312 determines that the logical volume is set one in number in the band (S84: Yes) when different bands are set in the boxes of "Band identification information" of the two extracted records 331 and performs processing of step S85. On the other hand, the volume setting unit 312 determines that the logical volume is set two in number in the band (S84: No) when the same band is set in the boxes of "Band identification information" of the two extracted records 331 and performs processing of step S89.

(Step S85) The volume setting unit 312 selects one SED from the record 331 generated in the LV management table 330 at step S82 (or the record 331 extracted from the LV management table 330).

(Step S86) The volume setting unit 312 requests the SED selected at step S85 to expand the range of the band neighboring the setting region of the logical volume to be subjected to the processing to a range that includes the logical volume to be subjected to the processing. When the band neighbors the storage region on the side nearer to the forefront than the logical volume to be subjected to the processing, the band manager 241 of the SED increases "Length" within the record 231 of the band management table 230 about the band so as to include the range of the logical volume to be subjected to the processing. On the other hand, when the band neighbors the storage region on the side nearer to the rear end than the logical volume to be subjected to the processing, the band manager 241 updates "Top address" within the record 231 of the band management table 230 about the band to the top address of the logical volume to be subjected to the processing.

(Step S87) The band manager 241 of the SED transmits the identification information of the band the range of which is expanded at step S86 to the volume setting unit 312 of the controller module 300a. The volume setting unit 312 registers the band identification information received from the band manager 241 in the box of "Band identification information" corresponding to the SED selected at step S85 of the registration boxes of the record 331 generated in the LV management table 330 at step S82 (or the record 331 extracted from the LV management table 330).

(Step S88) The volume setting unit 312 determines whether all the SEDs registered in the record 331 generated in the LV management table 330 at step S82 (or the record 331 extracted from the LV management table 330) have already been subjected to the processing. When there exists an SED not having been subjected to the processing yet (S88: No), the procedure returns to step S85 and the volume setting unit 312 selects one SED registered in the record 331 but not having been subjected to the processing. On the other hand, when all the registered SEDs have been subjected to the processing (S88: Yes), the volume setting processing is exited.

In the processing at steps S85 to S88 described above, a band common to the neighboring logical volume is set in the logical volume newly set or the logical volume requested to be restored to a band. Consequently, when the processing at steps S85 to S88 is performed, the number of bands to be set in the SED does not increase.

(Steps S89 to S91) When a band in which only one logical volume is set is not set in the region neighboring the logical volume to be subjected to the processing (S83: No or S84: No), processing of setting a new band at steps S89 to S91 is performed. The processing at steps S89, S90, S91, and S92 corresponds to the processing at steps S13, S14, S15, and S16 of FIG. 11, respectively.

That is, the volume setting unit 312 selects one SED from the record 331 generated in the LV management table 330 at step S82 (or the record 331 extracted from the LV management table 330) (step S89). Next, the volume setting unit 312 requests the SED selected at step S89 to newly set a band in the region corresponding to the logical volume to be subjected to the processing (step S90). Due to this, to the selected SED, a band corresponding to the region of the logical volume to be subjected to the processing is set additionally.

Further, the volume setting unit 312 registers identification information of the band set additionally in the box of "Band identification information" of the record 331 generated in the LV management table 330 at step S82 (or the record 331 extracted from the LV management table 330) (step S91). It may also be possible for the volume setting unit 312 to further make the setting of the automatic lock operation and the setting of the authentication key to release the lock state for the band set at step S90 based on the request from the management terminal 130.

Next, the volume setting unit 312 determines whether all the SEDs registered in the record 331 generated in the LV management table 330 at step S82 (or the record 331 extracted from the LV management table 330) have already been subjected to the processing (step S92). The volume setting unit 312 performs the processing at steps S89 to S91 on all the registered SEDs and exits the processing when all the SEDs have been subjected to the processing (S92: Yes).

Figure 21:
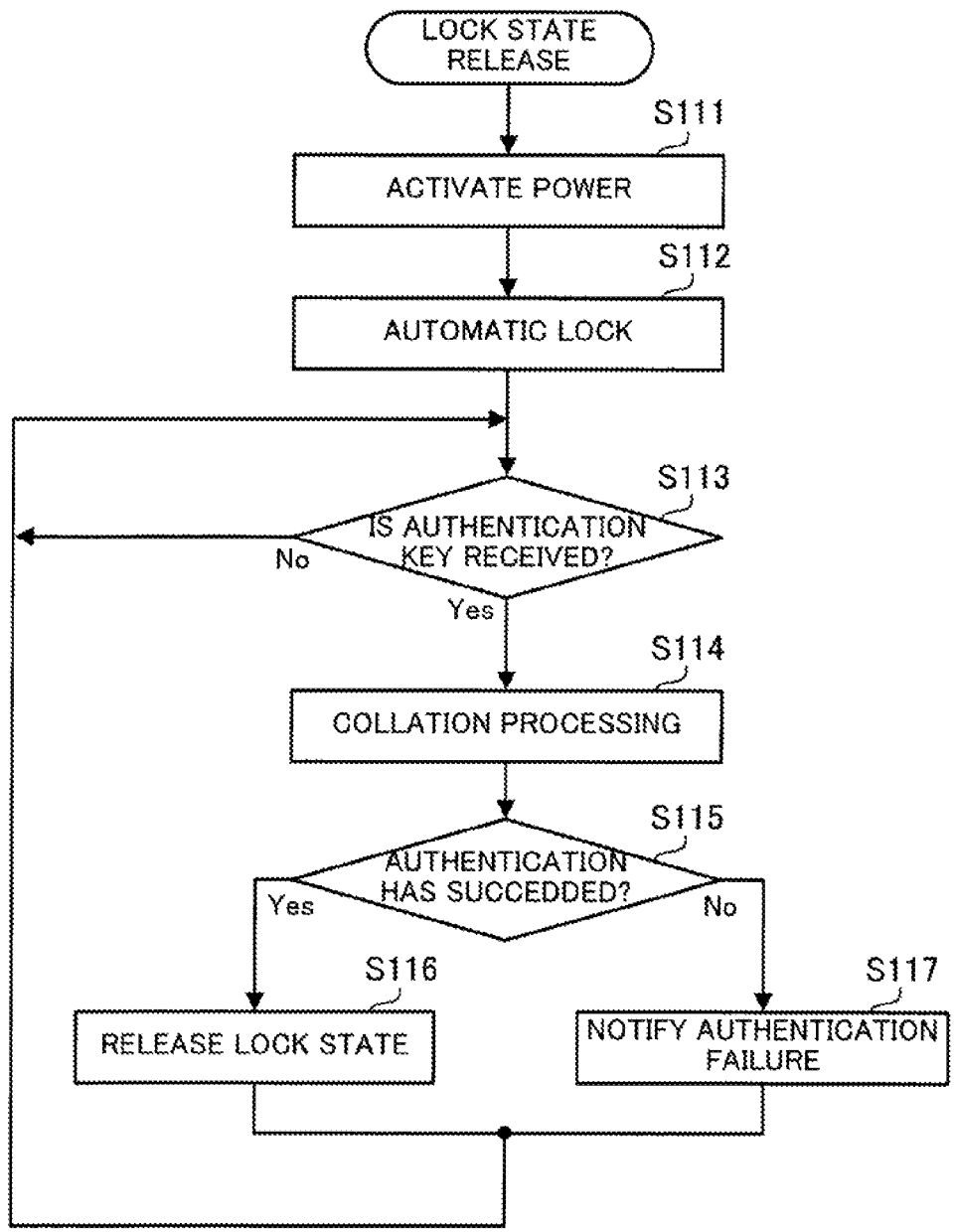
FIG. 21 is a flowchart of an example of a lock-state release processing procedure at the time of power activation of an SED.

FIG. 21 is a flowchart of an example of a lock state release processing procedure when the power source of the SED is turned on. Here, as an example, a case where the power source of the SED 210a is turned on is explained.

(Step S111) The lock controller 244 of the SED 210a detects that the operation to turn on the power source is performed when detecting that the power source switch, not illustrated schematically, is pressed etc.

(Step S112) The lock controller 244 extracts all the records 231 the value of "Lock enable" of which is "1" from the band management table 230 and brings the bands corresponding to the extracted records 231 into the lock state where access from outside is unavailable. At this time, the lock controller 244 updates the value of "Lock state" in all the records 231 extracted from the band management table 230 from indicative of the unlock state to "1" indicative of the lock state.

The authentication processor 314 of the controller module 300a having detected that the power source of the SED 210a is turned on searches the LV management table 330 and extracts the bands the key information of which is registered in the box of "Authentication key" (that is, the bands in which the automatic lock operation is enabled) and the SEDs in which the band is set. The authentication processor 314 sequentially transmits the identification information of the bands extracted in the same way and the authentication keys associated with the bands to each SED selected from the LV management table 330 and requests the SED to perform authentication processing for the bands in which the automatic lock operation is enabled.

(Step S113) The lock controller 244 of the SED 210a monitors the identification information and authentication keys of the bands to be authenticated from the authentication processor 314 of the controller module 300a. The lock controller 244 performs the processing of step S114 upon receipt of the identification information and authentication keys of the bands (S113: Yes).

(Step S114) The lock controller 244 extracts the record 231 corresponding to the identification information of the band received from the band management table 230 and extracts the hashed encryption key registered in the box of "Authentication key" from the extracted record 231. The lock controller 244 performs authentication processing by collating the hashed authentication key extracted from the record 231 with the value obtained by hashing the authentication key received from the controller module 300a at step S113.

(Step S115) When the authentication at step S114 has succeeded (S115: Yes), the lock controller 244 performs the processing of step S116. On the other hand, when the authentication of step S114 has failed (S115: No), the lock controller 244 performs the processing of step S117.

(Step S116) The lock controller 244 releases the lock state of the band to be authenticated. The lock controller 244 updates "Lock state" of the record 231 extracted from the band management table 230 at step S114 from "1" indicative of the lock state to "0" indicative that the state is not the lock state. The lock controller 244 notifies the authentication processor 314 of the controller module 300a that the authentication has succeeded. After that, the procedure returns to step S113 and the lock controller 244 monitors the identification information and authentication keys of other bands from the authentication processor 314 of the controller module 300a.

(Step S117) The lock controller 244 notifies the authentication processor 314 of the controller module 300a that the authentication has failed. In this case, the band to be authenticated remains in the lock state. After that, the procedure returns to step S113 and the lock controller 244 monitors the identification information and authentication keys of other bands from the authentication processor 314 of the controller module 300a.

Not limited to the present embodiment, it is also possible to perform the above-mentioned processing of FIG. 21 between the lock controller 244 of the SED and the authentication processor 314 of the controller module in the second embodiment described previously.

In the above-mentioned processing of FIG. 21, the larger the number of bands in which the automatic lock operation is enabled set in the SED 210a, the larger is the number of times of execution of steps S113 to S117. As a result of this, the larger the number of bands in which the automatic lock operation is enabled, the longer is the time needed from the turning-on of the power source of the SED 210a until access to the magnetic disc 211 within the SED 210a is permitted.

In contrast to this, according to the processing of FIG. 20 described previously, the number of bands set in the SED is smaller compared to the second embodiment. Consequently, the possibility that the number of set bands in which the automatic lock operation is enabled increases is reduced and the possibility that the time needed for the authentication processing when the power source of SED is turned on is reduced is raised.

Further, there is a case where the number of bands allowed to be set in the SED is limited by the specifications of a product. By the processing of FIG. 21, the number of bands set in the SED is reduced, and therefore, when the SED having the same number of bands allowed to be set is used, it is made possible to set the logical volumes in the number larger than the number in the second embodiment.

Figure 22:
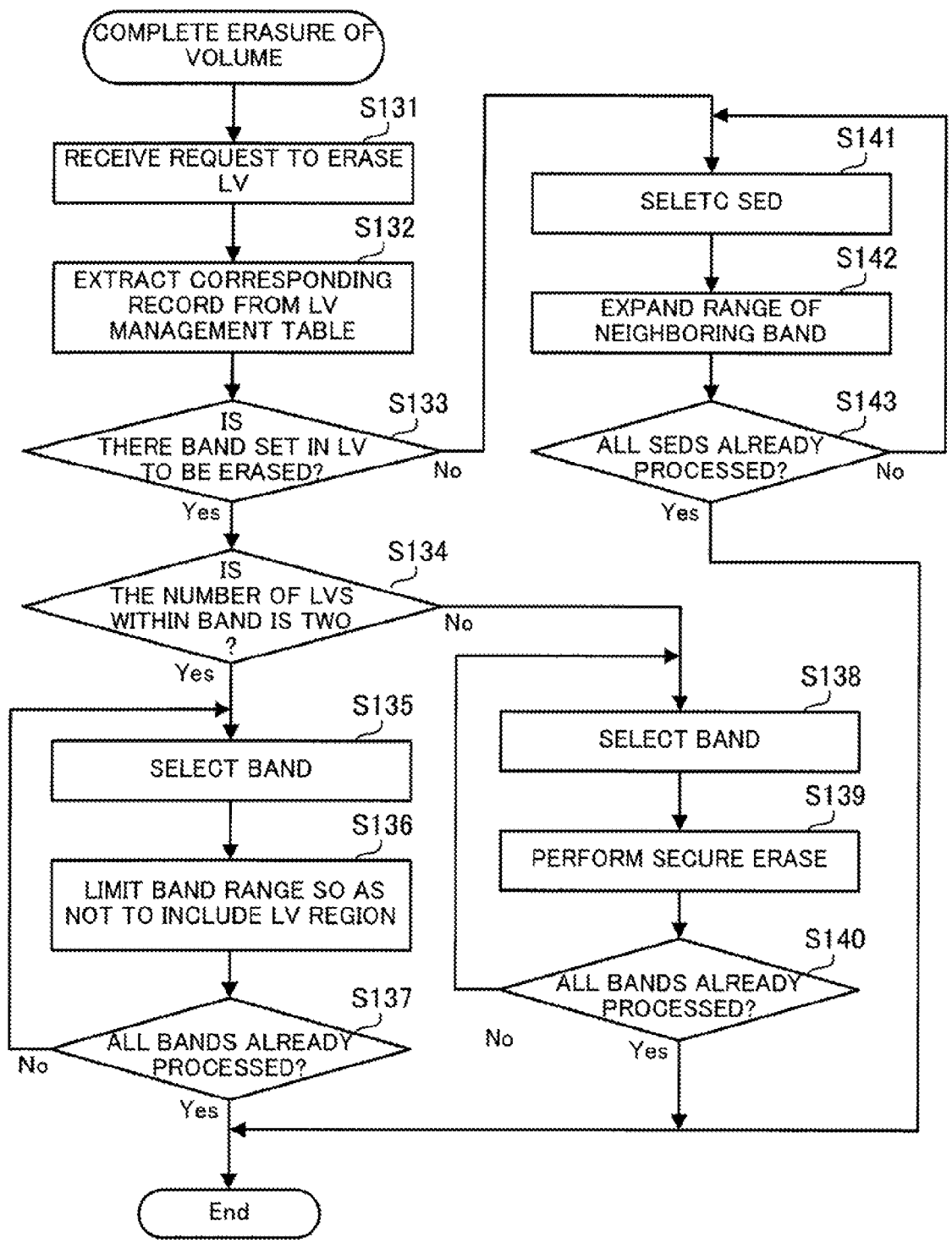
FIG. 22 is a flowchart of an example of a processing procedure when completely erasing a logical volume.

FIG. 22 is a flowchart of an example of a processing procedure when completely erasing the logical volume.

(Step S131) The secure erase controller 313 of the controller module 300a receives the specification of the logical volume and the request to completely erase the specified logical volume from the management terminal 130.

(Step S132) The secure erase controller 313 extracts the record 331 corresponding to the logical volume specified by the management terminal 130 from the LV management table 330.

(Step S133) The secure erase controller 313 determines whether a band is set in the logical volume to be erased based on the box of "Band identification information" of the record 331 extracted from the LV management table 330 at step S132. When a band is set (S133: Yes), the secure erase controller 313 performs the processing of step S134. On the other hand, when nothing is registered in the box of "Band identification information" and the logical volume to be erased belongs to the global band (S133: No), the secure erase controller 313 performs the processing of step S141.

(Step S134) The secure erase controller 313 determines whether another neighboring logical volume is included in the band in which the logical volume to be erased is included. For example, the secure erase controller 313 determines whether the registered value of "Band identification information" within the record 331 extracted from the LV management table 330 at step S132 agrees with the registered value of "Band identification information" within the records 331 before and after the record 331 in question. When they agree, the secure erase controller 313 determines that two logical volumes are included in the band (S134: Yes) and performs the processing of step S135. On the other hand, when they do not agree, the secure erase controller 313 determines that only one logical volume is included in the band (S134: No) and performs the processing of step S138.

(Step S135) The secure erase controller 313 selects one band indicated by "Band identification information" from the record 331 extracted from the LV management table 330 at step S132.

(Step S136) In the setting range of the band selected at step S135, the logical volume to be erased and the neighboring logical volume are included. The secure erase controller 313 requests the SED in which the band selected at step S132 is set to limit the setting range of the band to a range that does not include the region of the logical volume to be erased.

For example, the secure erase controller 313 transmits the registered value of "Band identification information" selected at step S135 and each piece of information of "Top address" and "Length" associated with the registered value to the SED and requests the SED to exclude the range indicated by each of the registered values of "Top address" and "Length" from the band. The band manager 241 of the SED limits the setting region of the corresponding band so as to exclude the logical volume to be erased by extracting the record 231 corresponding to the registered value of "Top address" that is received and updating "Top address" or "Length" within the extracted record 231.

When the logical volume to be erased is arranged on the side nearer to the forefront of the band, "Top address" within the record 231 is updated to the top address of the next logical volume. On the other hand, when the logical volume to be erased is arranged on the side nearer to the rear end of the band, "Length" within the record 231 is reduced by an amount corresponding to the volume of the logical volume to be erased. In either case, the region of the logical volume to be erased is changed to the global band in which an encryption key different from that used in the original band is used and the data recorded in the logical volume to be erased is completely erased.

(Step S137) The secure erase controller 313 determines whether all the bands registered in the record 331 extracted from the LV management table 330 at step S132 have already been subjected to the processing. When there exists a band not having been subjected to the processing yet (S137: No), the procedure returns to step S135 and the secure erase controller 313 selects one band registered in the record 331 but not having been subjected to the processing. On the other hand, when all the registered bands have been subjected to the processing (S137: Yes), the secure erase controller 313 exits the processing.

(Step S138) The secure erase controller 313 selects one band indicated by "Band identification information" from the record 331 extracted from the LV management table 330 at step S132.

(Step S139) In the band selected at step S138, only the logical volume to be erased is included. In this case, the secure erase controller 313 requests the SED in which the selected band is set to perform secure erase on the band. The band manager 241 of the SED having received the request extracts the record 231 corresponding to the band to be subjected to secure erase from the band management table 230 and updates the value registered in "Encryption key" within the extracted record 231 to the encryption key that the encryption key generator 242 is caused to generate. Due to this, the data recorded in the band to be subjected to secure erase is completely erased.

(Step S140) The secure erase controller 313 determines whether all the bands registered in the record 331 extracted from the LV management table 330 at step S132 have already been subjected to the processing. When there exists a band not having been subjected to the processing yet (S140: No), the procedure returns to step S138 and the secure erase controller 313 selects one band registered in the record 331 but not having been subjected to the processing. On the other hand, when all the registered bands have been subjected to the processing (S140: Yes), the secure erase controller 313 exits the processing.

(Step S141) The secure erase controller 313 selects one SED from the record 331 extracted from the LV management table 330 at step S132.

(Step S142) The logical volume to be erased belongs to the global band. Such a logical volume to be erased is, for example, the logical volume excluded from the setting range of the band by the processing of step S136 performed previously. In this case, in at least one of the logical volumes neighboring the logical volume to be erased, the band including only the region of the logical volume is set.

The secure erase controller 313 reads the registered information of "Band identification information" associated with the SED selected at step S141 from the record 331 of the logical volume in which the band including only the region of the logical volume in question is set of the neighboring logical volumes. The secure erase controller 313 transmits the registered information of "Band identification information" that is read and each piece of information of "Top address" and "Length" about the logical volume to be erased to the SED selected at step S141. Then, the secure erase controller 313 requests the SED to expand the range of the band indicated by the registered information of "Band identification information" to the range of the logical volume to be erased.

The band manager 241 of the SED having received the expansion request extracts the record 231 corresponding to the registered information of "Band identification information" from the band management table 230. The band manager 241 expands the setting region of the band to the region including the logical volume to be erased by updating "Top address" or "Length" in the extracted record 231.

When the region of the logical volume to be erased is located on the side nearer to the forefront than the band, the value of "Top address" within the record 231 is updated to the top address of the logical volume to be erased. On the other hand, when the region of the logical volume to be erased is located on the side nearer to the rear end than the band, to the value of "Length" within the record 231, the volume of the logical volume to be erased is added. In either case, the region of the logical volume to be erased is changed from the global band to the already existing band in which another encryption key is used, and therefore, the data recorded in the region of the logical volume to be erased is completely erased.

(Step S143) The secure erase controller 313 determines whether all the SEDs registered in the record 331 extracted from the LV management table 330 at step S132 have already been subjected to the processing. When there exists an SED not having been subjected to the processing yet (S143: No), the procedure returns to step S141 and the secure erase controller 313 selects one SED registered in the record 331 but not having been subjected to the processing. On the other hand, when all the registered SEDs have already been subjected to the processing (S143: Yes), the secure erase controller 313 exits the processing.

According to the above processing of FIG. 22, it is possible to completely erase the logical volume to be erased in a brief time by either the secure erase processing (S139) which is the same as that in the second embodiment or the processing of changing the setting region of the already existing band (S136, S142). That is, in the third embodiment, it is made possible to realize complete erasure in a brief time for each logical volume while obtaining the effect of reducing the number of set bands by setting one band in two logical volumes.

In the above third embodiment, one band is set in two logical volumes at the maximum, but, it may also be possible to set one band in three or more logical volumes. In that case, but, only the logical volume set on the side nearest to the forefront or on the side nearest to the rear end in the physical storage region of the SED of the plurality of the logical volumes in which the same band is set will be the logical volume to be erased completely for each logical volume.

According to the storage system, the storage controller, and the storage control method described above, it is possible to invalidate data recorded in a storage apparatus including the self encrypting function and encryption key generating function in a brief time.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A storage system comprising:
a storage apparatus; and
a control apparatus that controls access to the storage apparatus, wherein:
the storage apparatus includes:
an internal storage region,
a region manager that sets divided regions in the internal storage region, locally generates and manages encryption keys used for encryption for the respective divided regions, and changes, in a response to a request for changing an existing encryption key, the existing encryption key to a new encryption key that is generated locally; and
an encryption processor that encrypts data using an encryption key corresponding to a divided region in which the data is written, the encryption key being generated by the region manager, and records the encrypted data in the corresponding divided region; and
the control apparatus includes:
a logical volume setting unit that sets logical volumes and requests the region manager of the storage apparatus to set the divided regions corresponding to the respective logical volumes; and
a data erasure processor that requests the region manager of the storage apparatus to change the encryption key used for encryption of the divided region corresponding to the logical volume to be erased,
wherein the logical volume setting unit
determines, when setting a first logical volume in the storage apparatus, whether a first divided region correlated with a second logical volume is already set in a first storage region neighboring a second storage region of the first logical volume;
requests, when the first divided region is already set in the first storage region, the region manager to expand the first divided region so as to include the second storage region, and correlates the first divided region with the first logical volume; and
requests, when the first divided region is not set in the first storage region, the region manager to set a second divided region in the second storage region, and correlates the second divided region with the first logical volume.

2. The storage system according to claim 1, further comprising a plurality of storage apparatuses each having the region manager and the encryption processor, wherein:
in the control apparatus,
the logical volume setting unit requests the region managers of the plurality of storage apparatuses to set a divided region in the internal storage region included in each of the plurality of storage apparatuses when setting a logical volume spanning the plurality of storage apparatuses; and
the data erasure processor requests the region managers of the plurality of storage apparatuses to change the encryption key used for encryption of the divided region in each of the plurality of storage apparatuses corresponding to the logical volume to be erased when erasing the logical volume spanning the plurality of storage apparatuses.

3. The storage system according to claim 1, wherein when moving the logical volume set in the storage apparatus to a new storage region within the storage apparatus, the logical volume setting unit
expands the divided region in the storage apparatus corresponding to the logical volume to be moved to a range including the new storage region;
rearranges data in the new storage region of the expanded divided region; and
limits the expanded divided region to the new storage region after the data rearrangement is completed.

4. The storage system according to claim 1, wherein the data erasure processor, when erasing a logical volume set in the storage apparatus, if the divided region including the logical volume to be erased includes a plurality of logical volumes, limits the divided region so as to exclude the logical volume to be erased.

5. The storage system according to claim 1, wherein:
the storage apparatus has an access controller that blocks access to all the divided regions that are set at the time of power activation, performs authentication processing, with the control apparatus, on each divided region that is set, and permits access to the divided region that has succeeded in authentication; and
the control apparatus has an authentication processor that executes authentication processing, with the access controller, to obtain access permission for each divided region set in the storage apparatus.

6. The storage system according to claim 1, wherein the logical volume setting unit
determines, when determining that the first divided region is already set in the first storage region, whether the first divided region is correlated with more than one logical volumes, including the second logical volume, other than the first logical volume,
requests, when the first divided region is correlated with a single logical volume other than the first logical volume, the region manager to expand the first divided region so as to include the second storage region, and correlates the first divided region with the first logical volume, and
requests, when the first divided region is correlated with more than one logical volumes other than the first logical volume, the region manager to set the second divided region in the second storage region, and correlates the second divided region with the first logical volume.

7. A storage control apparatus comprising:
an interface to a storage apparatus having a function to locally generate and manage an encryption key and encrypt data using the generated encryption key when writing the data in an internal storage region of the storage apparatus;
a logical volume setting unit that sets logical volumes and requests the storage apparatus to set divided regions corresponding to the respective logical volumes in the internal storage region of the storage apparatus, the divided regions each being given a different encryption key that the storage apparatus generates for encryption of data to be recorded therein, and
a data erasure processor that requests the storage apparatus to change the encryption key used for encryption in a divided region corresponding to a logical volume to be erased,
wherein the logical volume setting unit
determines, when setting a first logical volume in the storage apparatus, whether a first divided region correlated with a second logical volume is already set in a first storage region neighboring a second storage region of the first logical volume;
requests, when the first divided region is already set in the first storage region, the storage apparatus to expand the first divided region so as to include the second storage region, and correlates the first divided region with the first logical volume; and requests, when the first divided region is not set in the first storage region, the storage apparatus to set a second divided region in the second storage region, and correlates the second divided region with the first logical volume.

8. The storage control apparatus according to claim 7, wherein:

the storage control apparatus is connected to a plurality of storage apparatuses each including an internal storage region and a function to locally generate and manage an encryption key and encrypt data using the generated encryption key when writing the data in the internal storage region;

the logical volume setting unit, when setting a logical volume spanning the plurality of storage apparatuses, requests the plurality of storage apparatuses to set a divided region in the internal storage region included in each of the plurality of storage apparatuses; and the data erasure processor, when erasing the logical volume spanning the plurality of storage apparatuses, requests the plurality of storage apparatuses to change the encryption key used for encryption in the divided region in each of the plurality of storage apparatuses corresponding to the logical volume to be erased.

9. The storage control apparatus according to claim 7, wherein when moving the logical volume set in the storage apparatus to a new storage region within the storage apparatus, the logical volume setting unit expands the divided region in the storage apparatus corresponding to the logical volume to be moved to a range including the new storage region;

rearranges data in the new storage region of the expanded divided region, and limits the expanded divided region to the new storage region after the data rearrangement is completed.

10. The storage control apparatus according to claim 7, wherein the data erasure processor, when erasing a logical volume set in the storage apparatus, if the divided region including the logical volume to be erased includes a plurality of logical volumes, limits the divided region so as to exclude the logical volume to be erased.

11. The storage control apparatus according to claim 7, wherein:

in the storage apparatus, access to all the divided regions that are set is blocked at the time of power activation; and the storage control apparatus has an authentication processor that executes authentication processing, with the storage apparatus, to obtain access permission for each divided region set in the storage apparatus.

12. A storage control method comprising:

setting, by a storage control apparatus, logical volumes;

requesting, by the storage control apparatus, a storage apparatus to set divided regions corresponding to the respective logical volumes, in an internal storage region of the storage apparatus;

locally generating and managing encryption keys by the storage apparatus;

setting, by the storage apparatus, the generated encryption keys to the divided regions individually; and encrypting, by the storage apparatus, data to be written in the divided regions by using the encryption keys set individually to the divided regions;

requesting, by the storage control apparatus, the storage apparatus to change the encryption key used for encryption in a divided region corresponding to a logical volume to be erased, wherein the setting logical volumes includes:

determining, when setting a first logical volume in the storage apparatus, whether a first divided region correlated with a second logical volume is already set in a first storage region neighboring a second storage region of the first logical volume, requesting, when the first divided region is already set in the first storage region, the storage apparatus to expand the first divided region so as to include the second storage region, and correlating the first divided region with the first logical volume, and requesting, when the first divided region is not set in the first storage region, the storage apparatus to set a second divided region in the second storage region, and correlating the second divided region with the first logical volume.

13. The storage control method according to claim 12, wherein:

the storage control apparatus is connected to a plurality of storage apparatuses each including a function to locally generate and manage an encryption key and encrypt data using the generated encryption key when writing the data in an internal storage region thereof, the storage control method further including:

requesting, by the storage control apparatus when setting a logical volume spanning the plurality of storage apparatuses, the plurality of storage apparatuses to set a divided region in the internal storage region included in each of the plurality of storage apparatuses; and requesting, by the storage control apparatus when erasing the logical volume spanning the plurality of storage apparatuses, the plurality of storage apparatuses to change the encryption key used for encryption in the divided region in each of the plurality of storage apparatuses corresponding to the logical volume to be erased.

14. The storage control method according to claim 12, further comprising moving, by the storage control apparatus, the logical volume set in the storage apparatus to a new storage region within the storage apparatus, by:

expanding the divided region in the storage apparatus corresponding to the logical volume to be moved to a range including the new storage region;

rearranging data in the new storage region of the expanded divided region; and limiting the expanded divided region to the new storage region after the data rearrangement is completed.

15. The storage control method according to claim 12, further comprising:

determining, by the storage control apparatus when erasing a logical volume set in the storage apparatus, whether the divided region including the logical volume to be erased includes a plurality of logical volumes, and limiting the divided region that is determined to include a plurality of logical volumes, so as to exclude the logical volume to be erased.

16. The storage control method according to claim 12, further comprising:

blocking, by the storage apparatus, access to all the divided regions at the time of power activation; and executing, by the storage control apparatus, authentication processing, with the storage apparatus, to obtain access permission for each divided region set in the storage apparatus.

* * * * *